(12) United States Patent
Rottenberg

(10) Patent No.: US 7,782,594 B2
(45) Date of Patent: Aug. 24, 2010

(54) MEMS VARIABLE CAPACITOR AND METHOD FOR PRODUCING THE SAME

(75) Inventor: Xavier Rottenberg, Schaarbeek (BE)

(73) Assignee: IMEC, Leuven (BE)

( * ) Notice: Subject to any disclaimer, the term of this patent is extended or adjusted under 35 U.S.C. 154(b) by 314 days.

(21) Appl. No.: 11/893,990

(22) Filed: Aug. 17, 2007

(65) Prior Publication Data
US 2008/0055815 A1 Mar. 6, 2008

Related U.S. Application Data

(60) Provisional application No. 60/838,768, filed on Aug. 18, 2006.

(30) Foreign Application Priority Data

Feb. 14, 2007 (EP) .................................. 07102351

(51) Int. Cl.
*H01G 5/01* (2006.01)
(52) U.S. Cl. ..................... 361/278; 361/277; 361/290; 361/292; 361/283.3; 361/282
(58) Field of Classification Search ................. 361/272, 361/273, 277–278, 280–282, 290–292, 287; 333/134–135, 174
See application file for complete search history.

(56) References Cited

U.S. PATENT DOCUMENTS

| | | | |
|---|---|---|---|
| 6,057,520 A * | 5/2000 | Goodwin-Johansson | 200/181 |
| 6,229,684 B1 * | 5/2001 | Cowen et al. | 361/278 |
| 6,290,510 B1 | 9/2001 | Fork et al. | |
| 6,507,475 B1 * | 1/2003 | Sun | 361/281 |
| 6,625,004 B1 | 9/2003 | Musolf et al. | |
| 6,683,513 B2 * | 1/2004 | Shamsaifar et al. | 333/135 |
| 6,906,905 B1 | 6/2005 | Chinthakindi | |
| 7,085,122 B2 * | 8/2006 | Wu et al. | 361/277 |
| 2003/0201852 A1 * | 10/2003 | Eliacin et al. | 333/262 |
| 2004/0036132 A1 * | 2/2004 | de los Santos | 257/414 |
| 2005/0013087 A1 | 1/2005 | Wu et al. | |

FOREIGN PATENT DOCUMENTS

EP 1536439 A1 1/2005

(Continued)

OTHER PUBLICATIONS

Extended European Search Report dated Jun. 11, 2007 for European Application No. EP07102351.9.
T. Sterken et al., An electret-based electrostatic micro-generator, Proceedings of Transducers, The 12th International Conference on Solid State Sensors, Actuators and Microsystems, Jun. 8-12, 2003, Boston, USA, IEEE 2003, p. 1291-1294.

(Continued)

*Primary Examiner*—Nguyen T Ha
(74) *Attorney, Agent, or Firm*—Knobbe Martens Olson & Bear LLP

(57) ABSTRACT

One inventive aspect relates a variable capacitor comprising first and second electrically conductive electrodes, arranged above a support structure and spaced apart from each other and defining the capacitance of the capacitor. At least one of the electrodes comprises at least one bendable portion. The bendable portion(s) are actuated by a DC voltage difference which is applied over the electrodes to vary the capacitance. In preferred embodiments, the support structure comprises a layer of higher permittivity than the atmosphere surrounding the electrodes and the electrodes configure as an interdigitated structure upon actuation. Also disclosed is a 2-mask process for producing such capacitors.

22 Claims, 23 Drawing Sheets

FOREIGN PATENT DOCUMENTS

| WO | WO 97/01221 | 1/1997 |
| WO | WO 01/45127 A1 | 6/2001 |
| WO | WO 02/079076 A1 | 10/2002 |
| WO | WO 2004/080886 A1 | 9/2004 |

OTHER PUBLICATIONS

X. Rottenberg et Al., RF-MEMS Technology Platform For Agile Mobile And Satellite Communications, Proc. Of The 36$^{th}$ European Microwave Conf., pp. 1723-1726, Sep. 2006.

* cited by examiner

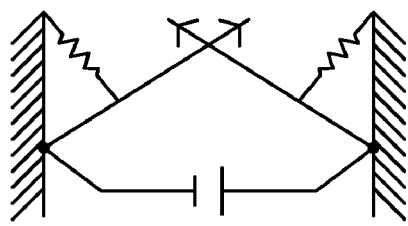
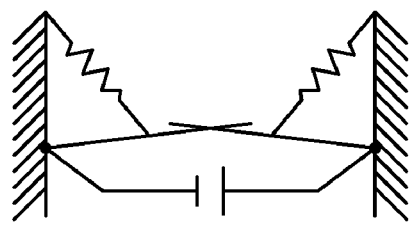
FIG. 6A　　　　　　　　　FIG. 6B
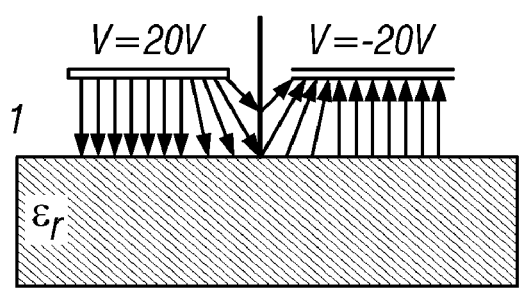
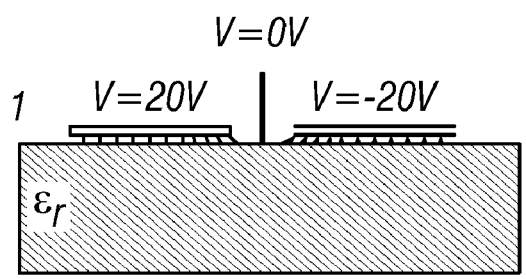
FIG. 7A　　　　　　　　　FIG. 7B

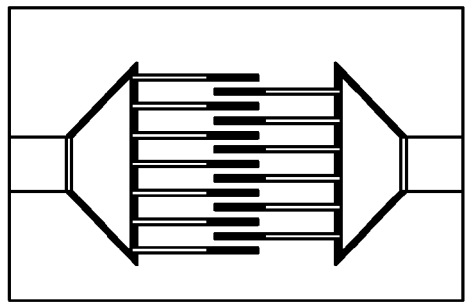 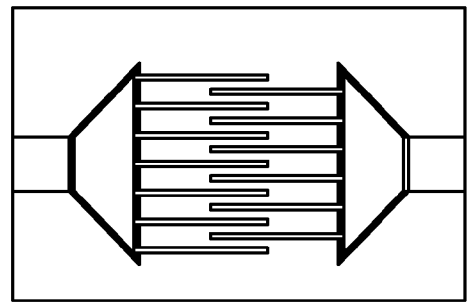
FIG. 8A  FIG. 8B
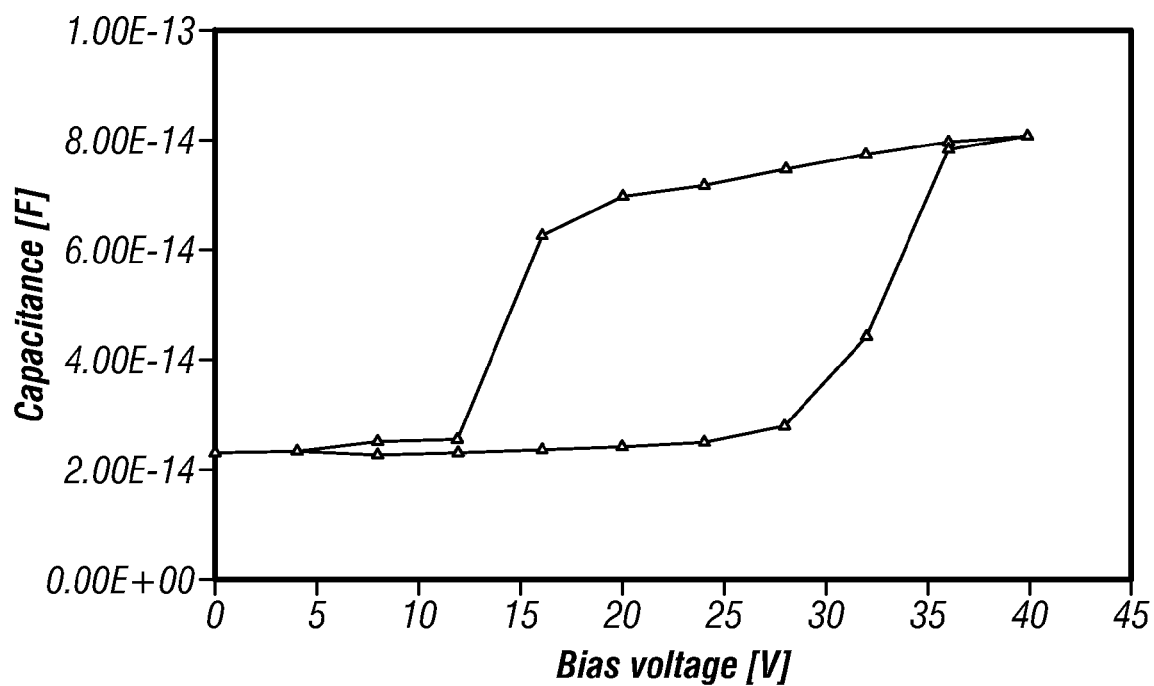
FIG. 9

(a)

(b)

MEMS VARIABLE CAPACITOR AND METHOD FOR PRODUCING THE SAME

CROSS REFERENCE TO RELATED APPLICATIONS

This application claims priority under 35 U.S.C. §119(e) to U.S. provisional patent application No. 60/838,768 filed on Aug. 18, 2006, which application is hereby incorporated by reference in its entirety.

BACKGROUND OF THE INVENTION

1. Field of the Invention

The present invention relates to the field of Micro Electromechanical system (MEMS) devices. It relates to electrostatic MEMS devices as variable capacitor devices and a method for producing them.

2. Description of the Related Technology

Different electrostatic actuators are known.

Comb-drive structures as an electrostatic actuator are known [Sterken T. et al., An electret-based electrostatic micro-generator, Proceedings of Transducers, The 12th International Conference on Solid State Sensors, Actuators and Microsystems, 8-12 Jun. 2003, Boston, USA, IEEE 2003, p. 1291-1294.]. This type of devices requires thick films or armatures and is therefore often realized by bulk processing, i.e. patterning the bulk of the substrate and using itself as a moving part of the device. Upon application of a bias voltage between the electrodes (fingers), the sets of inter-digitated fingers, shown e.g. in FIG. 1, shift into each other. The movement uses the single degree of freedom available to the system, i.e. the direction of the fingers; in other words the devices move in-plane.

Parallel-plate capacitors as an electrostatic actuator are also known [X. Rottenberg et al., RF-MEMS technology platform for agile mobile and satellite communications, Proc. of the 36$^{th}$ European Microwave Conf., pp. 1723-1726, September 2006]. This type of devices is often preferred for on-chip actuators as they only require in principle a few additional thin-film processing steps. This type of structures is indeed produced by a typical 4-mask process flow realized on top of a dielectric (insulated) substrate. Upon actuation, the movable plate or electrode gets nearer to the fixed, bottom electrode one; the device moves out-of-plane as shown e.g. in FIG. 2, whereby the movable electrode approaches the bottom electrode. The electrodes remain in different planes.

Examples of electrostatic devices (sensors and actuators) are RF-MEMS switches, switchable capacitors, tilting mirrors, power scavengers, accelerometers . . . etc. These prior art devices have the problem that integration of a 4-masks process in/or above another process is rather difficult. Moreover the dielectric layer is typically sensitive to various charging mechanisms. The release process also has a strong impact on the dielectric properties. Often malfunction of clamped-free devices occurs due to the stress-gradient in the armature.

A three-dimensional variable capacitor is described in US-patent 2005/6906905. The electrodes of the capacitor are formed in an interdigitated manner with movable MEMS comb drive electrode beams. Control or actuation electrodes on the beams drive their motion either individually or all in unison, leading to changes in the capacitance. The structure of this variable capacitor is very complex.

It is desirable to provide a variable capacitor which shows a less complex structure and which is as a result easier to manufacture.

It is further desirable to provide a simple method for producing a variable capacitor.

SUMMARY OF CERTAIN INVENTIVE ASPECTS

A variable capacitor comprises first and second electrically conductive electrodes and a support structure. The first and second electrodes are arranged above the support structure, defining the capacitance of the capacitor. The first and second electrodes are positioned such with respect to each other, that their orthogonal projections on the plane of the support structure do not overlap. At least one of the electrodes comprises at least one bendable portion. The bendable portions are movable perpendicular to the support structure. The variable capacitor further comprises an actuation element for actuating each bendable portion to vary the capacitance of the variable capacitor. The actuation element comprises an element for generating a DC voltage difference between the electrodes.

The variable capacitor uses fringing fields as actuation mechanism. Upon actuation, each of the bendable portions of the electrodes will move in order to maximize the capacitance while minimizing its energy.

An analysis of the problem of the prior art variable capacitor has shown that the structure is very complex in view of the fact that actuation of the motion of the movable comb is driven by extra actuation electrodes. In the variable capacitor, no extra actuation electrodes need to be implemented, since the bendable portions which are part of the capacitor electrodes are used themselves for actuation. The same elements of the variable capacitor are used for actuation and for controlling the capacitance, simplifying the structure severely while maintaining a device which has a large capacitance ratio or tuning range. Because of the simplified structure, the device can be produced in a simple 2-mask process. The simplicity allows a vast flexibility for the processing and as a result strongly eases the integration of such devices into existing technologies.

In one embodiment, the actuation element further comprises a layer within the support structure (103) having a higher permittivity value than the atmosphere surrounding the electrodes. The proximity of this layer in the support structure with its higher permittivity produces an unbalance in the electric field distribution between top and bottom faces of the electrodes. Upon actuation with an increasing voltage, the unbalance results in a net force, towards the high permittivity support structure. The bendable portions configure such that they are pulled towards the support structure. Again, to maximize the capacitance while minimizing its energy, the electrodes may come into physical contact with the support structure.

Preferably, the electrodes are arranged essentially in the same plane, while the bendable portions are laying out of that plane in idle state, due to their residual stress gradient. To maximize the capacitance upon actuation, the bendable portions configure such that they are positioned essentially in the plane.

Preferably, each of the electrodes comprises at least one bendable portion. The bendable portions are preferably formed by cantilevered structures, having an anchored portion and a free-standing portion.

The electrodes preferably comprise patterned metal layers. The electrodes may further be formed out of the same layer.

In another embodiment, the electrodes comprise sub layers. These sub layers can be made for example of metal, dielectric or piezoelectric. In the case of piezoelectric, piezoelectric actuation can be used in combination with the fringing fields actuation mechanism. Piezoelectric actuation could for example be used in a first stage of the actuation for bringing the electrodes closer to each other or to the support structure, easing further actuation. The electrodes can also be patterned in order to for example stiffen the electrodes and/or tune their spring constant.

In another embodiment, one of the electrodes is completely fixed on the support structure. In this embodiment, the actuation mechanism will be dominated by the fringing fields' actuation. This has the advantage of lowering the required actuation voltage. In an alternative embodiment, the support structure is provided with recesses arranged for accepting the bendable portions when actuated. This would allow for example the definition of variable capacitor with fixed stable actuated state without contact with the substrate and the production of large amplitude rotary device with large excursion within the substrate.

In one embodiment, the length of the digitated structures is varied, so that a more progressive tuning can be achieved.

The support structure may comprise only the high permittivity layer, or be a multilayer structure. The substrate can be for example a dielectric or a stack of dielectrics like for example a glass, quartz, sapphire, diamond, soda lime, Pyrex, ... wafer coated with for example about 200 nm thick sputtered $Ta_2O_5$ ($\in_r=25$) or about 5 µm thick BCB ($\in_r=2.7$). Also;

a) a laminate or PCB, composed of one or more layers of for example FR4, LCP or Rogers materials
b) a complex multilayer stack like MCM-D, HTCC, LTCC interconnect substrates comprising patterned conductive layers.

In an alternative embodiment, the support structure comprises an MCM-D substrate.

In other embodiments, a number of variable capacitor based RF devices and circuits are presented. Possible examples are an LC-tank, a relay, a shunt relay capacitor and a series relay capacitor. All applications comprise the variable capacitor. The variable capacitor as described herein can also be used as or in a sensor.

A second aspect of the present invention presents a method for the production of a variable capacitor. A method for the production in a 2-mask process of a variable capacitor comprising:

a) providing a sacrificial layer on a support substrate;
b) producing a conductive layer on the sacrificial layer in a predetermined plane;
c) patterning the conductive layer so as to define first and second electrodes of the variable capacitor, at least one of which comprises at least one bendable portion; and
d) releasing the at least one bendable portion by local removal of the sacrificial layer, whereby the bendable portion or portions curl out of the plane of the conductive layer.

In an embodiment, the method of patterning the conductive layer further results in the first electrode and the second electrode being interdigitated structures.

In an embodiment, the method further comprises providing recesses in the support substrate, the recesses being arranged for accepting the bendable portions when actuated.

In another aspect, a variable capacitor is disclosed. The capacitor comprises means formed above a support structure for defining the capacitance, the defining means further comprising means being movable perpendicular to the support structure and thus varying the capacitance. The capacitor further comprises means for controlling the movement of the movable means.

BRIEF DESCRIPTION OF THE DRAWINGS

These and other features, aspects and advantages of the present invention will become better understood with regard to the following description, appended claims, and accompanying drawings here.

FIG. 6 shows the realized device in its (a) idle and (b) actuated states.
FIG. 7 shows schematic the free-standing-to-contacted electrostatic actuation.
FIG. 8 shows an interdigitated example of one embodiment in its (a) idle and (b) actuated states.
FIG. 9 shows a typical C-V characteristic of an actuated device.

DETAILED DESCRIPTION OF CERTAIN INVENTIVE EMBODIMENTS

Figure 1:
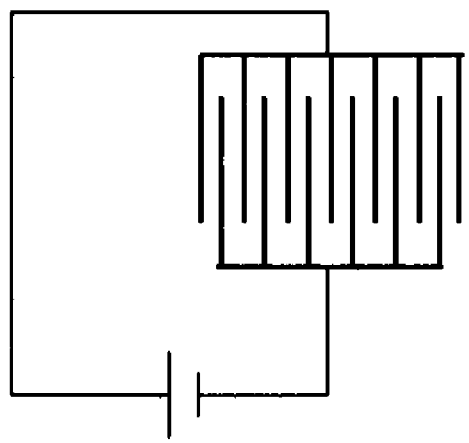
FIG. 1 shows a prior art comb-driven electrostatic device.
Figure 2:
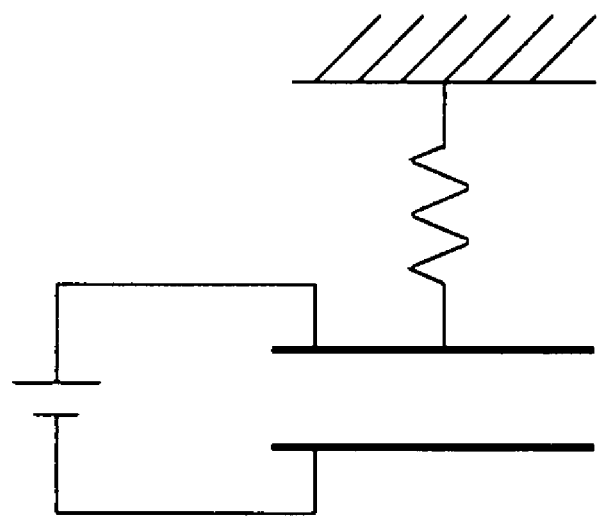
FIG. 2 shows a prior art parallel-plate electrostatic device.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Figure 3:
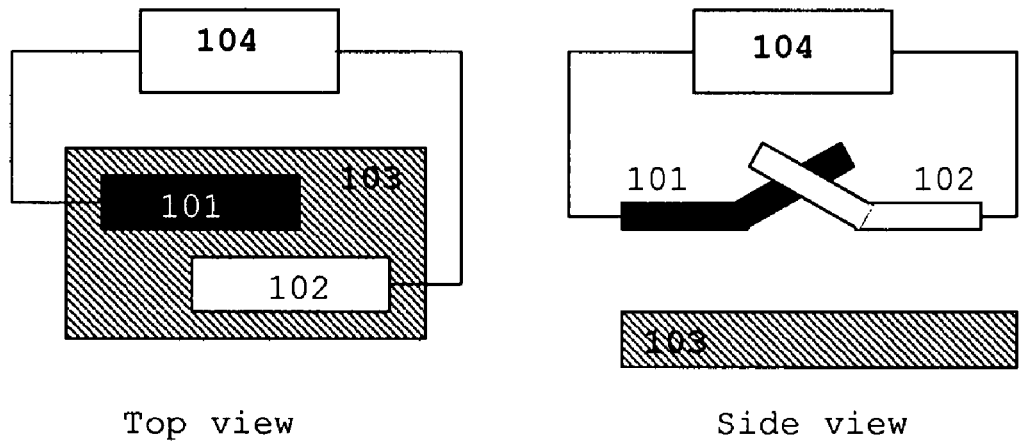
FIG. 3 shows a block diagram of one embodiment of the variable capacitor.

One embodiment of a variable capacitor is illustrated in FIG. 3. A first (101) and a second (102) electrically conductive electrode, spaced apart from each other, define the capacitance of a capacitor. At least one electrode is arranged such that a portion of the electrode is bendable. The electrodes are arranged in such a way above a support structure (103) that they have non-overlapping orthogonal projections on the plane of the support structure. The bendable portions are movable in a direction perpendicular to the support structure and not in a direction parallel to this support structure. Further, the variable capacitor comprises an actuation element for actuating the bendable portion to vary the capacitance of the variable capacitor. The actuation element comprises an element (104) for generating a voltage difference between the conductive electrodes.

In one embodiment, this support structure (103) is typically a substrate with a permittivity value higher than the atmosphere surrounding the electrodes.

In another embodiment, each of the electrodes comprises at least one of the bendable portions. The electrodes are arranged essentially in the same plane, while the bendable portions are laying out of that plane due to their residual stress gradient. Upon actuation, a voltage difference is generated between the electrodes and the bendable portions align.

In an embodiment, the bendable portions are cantilevered structures, having an anchored portion (201) and a free-standing portion (202).

Figure 4:
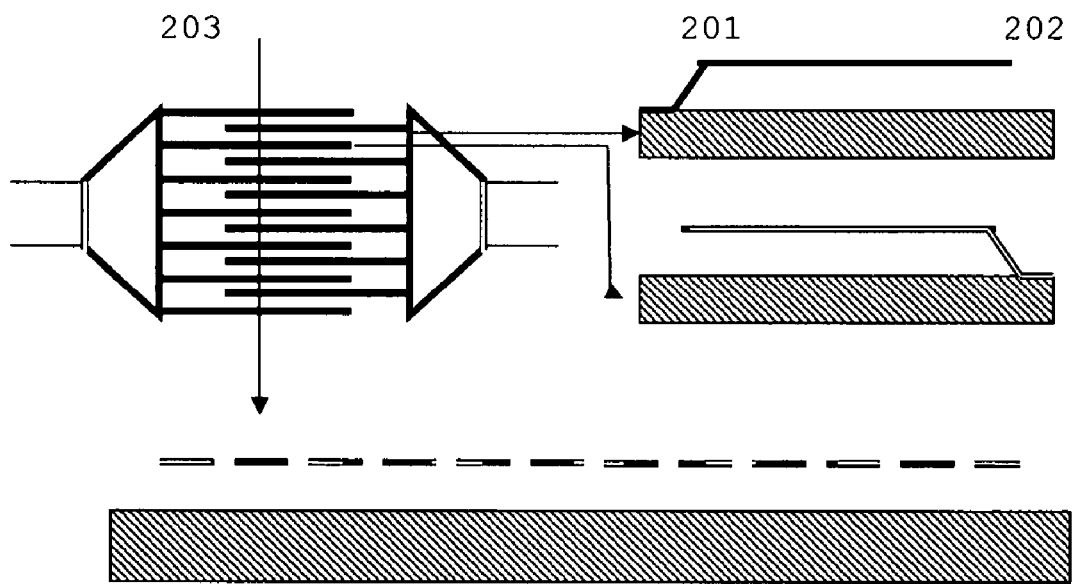
FIG. 4 shows the top view and cross sections of an interdigitated structure according to one embodiment.
Figure 5:
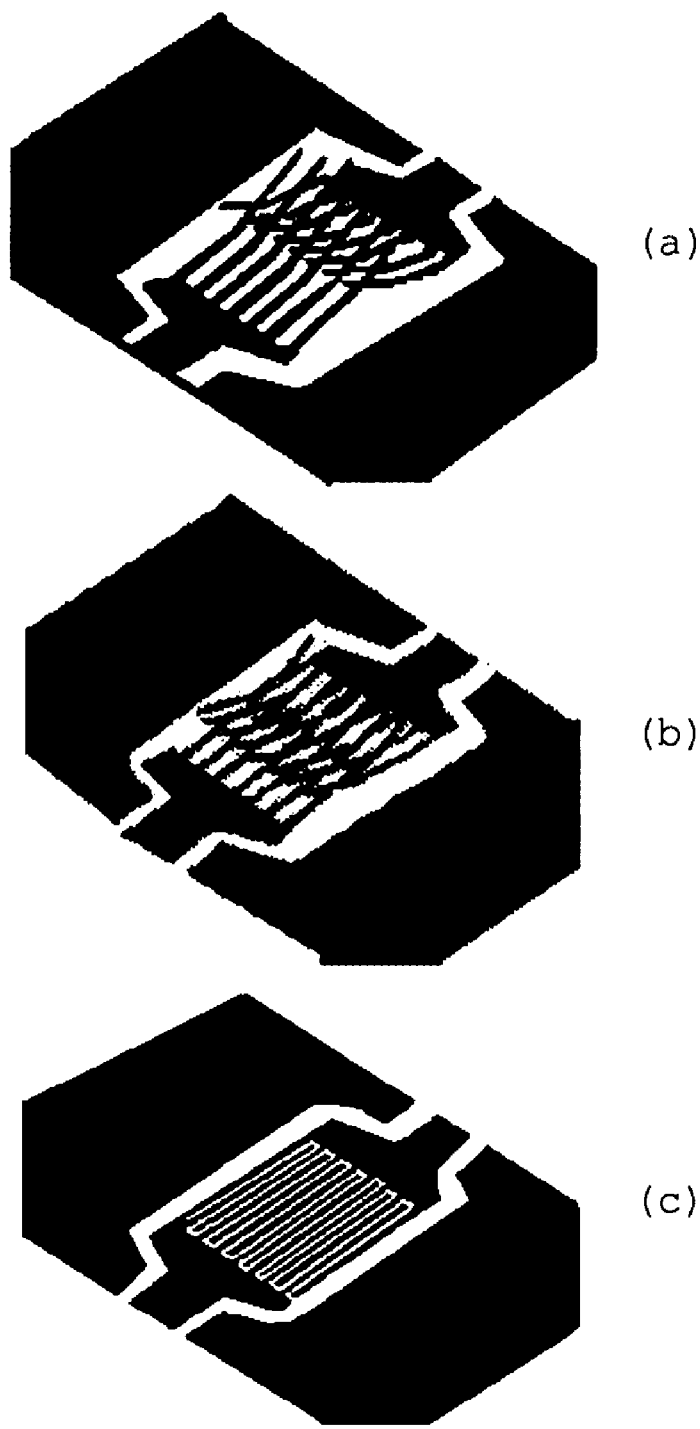
FIG. 5 shows schematic the out-of-plane-to-in-plane electrostatic actuation.

Embodiments according to the present invention are shown in FIG. 4. They comprise two sets of movable interdigitated fingers (203) free-standing above the substrate. There is no electrode underneath the fingers. In the idle state, the beams curl out-of-plane as shown in FIG. 5(a) due to their residual stress gradient, lowering the rest capacitance between the fingers.

Another inventive aspect is the alignment of the fingers. A DC-voltage (104) applied between the 2 electrodes produces fringing fields that result in opposite torques working on both sets of fingers as shown in FIG. 6(a). These tend to align (FIG. 6(b)) the fingers parallel to each other. This is sketched in FIG. 6, where straight rigid conductors rotating around their fixed anchors symbolize the fingers. The springs account for the stiffness of the fingers. The uncurling is depicted in FIG. 5(a) to FIG. 5(c). By aligning, the fingers maximize their total capacitance.

Another inventive aspect describes a second actuation principle. The support structure has a higher permittivity value than the surrounding atmosphere as e.g. vacuum, air, gases, oil or other fluids. The proximity to the substrate with $\in_r > 1$ produces an unbalance of the E-field distribution between top and bottom faces of the fingers. FIG. 7 shows a cell of the periodic cross-section through the width of the fingers. Because of the symmetry induced by the periodic arrangement of the fingers, an equipotential plane occupies the centre of each slot (FIG. 7(a)). The total force on each finger is vertical that tends to get both families of fingers to contact the substrate. The fields are mainly directed towards the dielectric substrate due to its high relative permittivity $\in_r$. As a result, the capacitance is increased, while remaining aligned to each other (FIG. 7(b)). (Note that the external fingers differ from the others by the non-symmetry of the lateral force they are subject to. For the proper actuation of these fingers, the design relies on the lateral rigidity of the thin film cantilever beams.)

The fringing-fields actuation principle that has been demonstrated can be used also as an electrostatic sensing mechanism.

The idle and actuated states of the device are shown in FIG. 8. In the idle-state, the tips of the fingers appear dark as they do not reflect the light towards the microscope (FIG. 8(a)). These are the areas of maximum deflection. Upon actuation, the fingers flatten on the surface of the substrate and appear uniformly shiny (FIG. 8(b)). The corresponding C-V characteristic is shown in FIG. 9.

Figure 10:
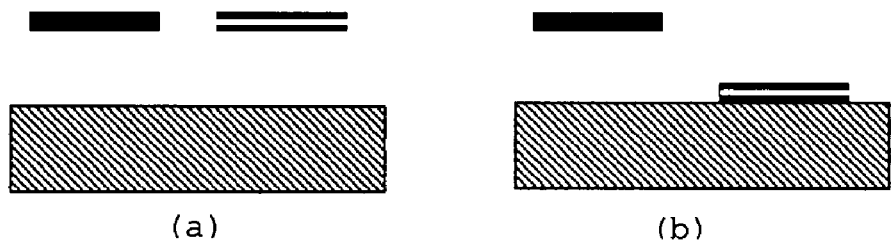
FIG. 10 shows the cross section of the standard device and its asymmetric embodiment.
Figure 12:
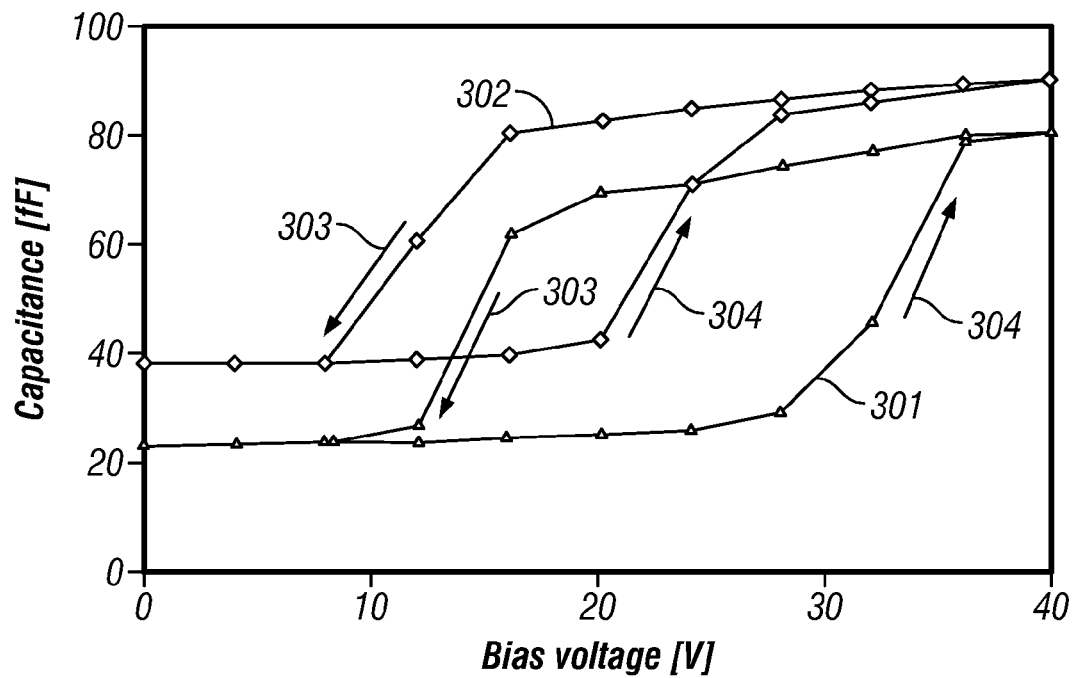
FIG. 12 shows a comparison of the measured C-V characteristics of the standard device and its asymmetric embodiment.

In embodiments according to the present invention, a modified structure has been realized in a similar process flow, where one family of fingers was completely fixed and produced in contact with the substrate (the difference being illustrated in FIG. 10(a) shows the symmetric embodiment, FIG. 10(b) shows the asymmetric embodiment). The corresponding C-V characteristic is shown in FIG. 12. Line (301), respectively (302) represents the C-V characteristic of the symmetric embodiment, respectively the asymmetric embodiment. The capacitance increases with increasing bias voltage. At the moment the electrodes come in contact with the substrate, "pull-in", the capacitance increases faster (304). Reversely, the capacitance decreases slowly with a decreasing voltage. At the "pull-out" instance, the capacitance drops (303). At least the following effects can be seen for the asymmetric embodiment, which are illustrated in FIG. 12:

Lowering of the actuation voltage.
Increase of the idle-capacitance.
Increase of the actuated-capacitance.

Figure 13A:
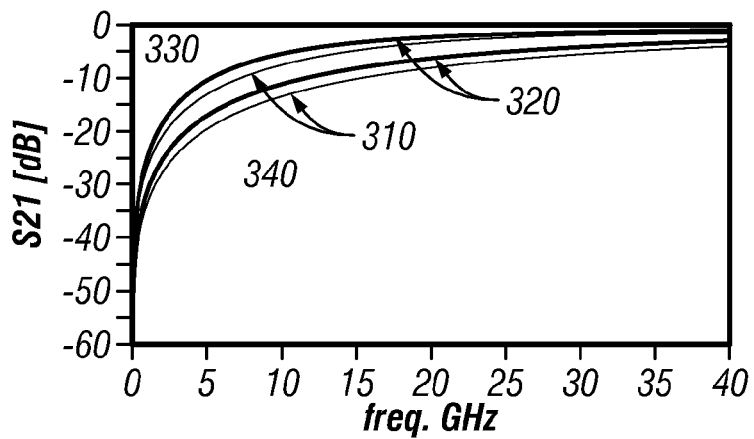
FIG. 13 shows some plots of the measured S-parameters of the standard device and its asymmetric embodiment.
Figure 13B:
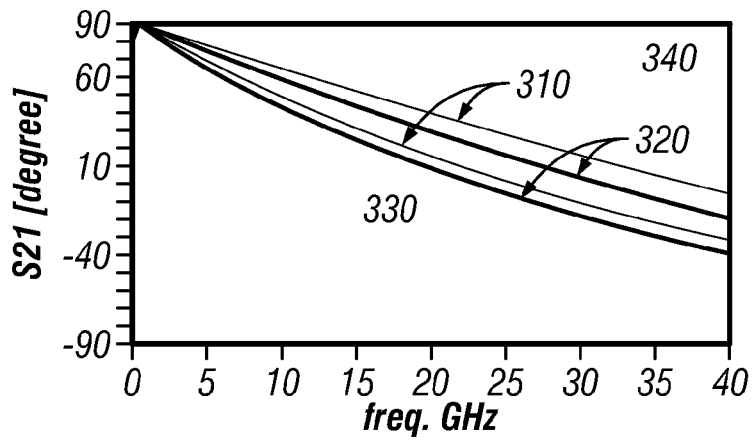

The measured transmission parameter, i.e. $S_{21}$ of both the symmetric (310) and the asymmetric (320) devices in rest (340) and in actuated (330) states are plotted in FIG. 13. FIG. 13(a) shows the amplitudes and FIG. 13(b) the phase of the measured transmission parameter. These characteristics are typical transmission parameters of series capacitances and demonstrate the possibility to use these devices for RF applications in wide frequency ranges.

In alternative embodiments, further modifications of the capacitance ratio can be realized by changing for instance (1) the design, e.g. the length/width/spacing of the fingers, (2) the substrate, the layered substrate, and (3) the ambiance or environment, the gas/fluid, e.g. oil.

Interdigitated devices are not really needed. In an aspect of the invention the essence is to use the fact that the fringing fields go through the dielectric or insulated substrate for the actuation.

Cantilever beams are also not really needed. A foot may be for example placed at the end of the beams, hereby creating bridge-type structures in order not to rely on the reproducibility of the stress gradient in the beams. In the idle state the beams will not curl out of plane.

Embodiments according to the present invention have the advantage that they can essentially be produced by a two mask process (a. sacrificial layer (120) and b. movable and/or fixed electrode (130)). A single metal layer and mask can be used for forming the capacitor electrodes. Moreover no dielectric layer is necessary except for the one to insulate the substrate.

Figure 11:
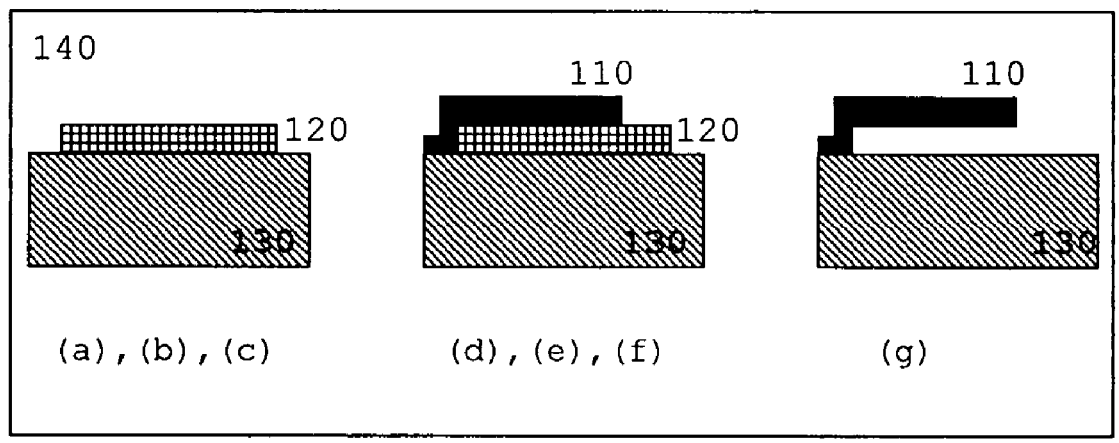
FIG. 11 shows a basic process flow.

An example of process flow (140) according to embodiments of the present invention is described below and represented in FIG. 11:

a) A glass wafer (130), e.g. 650 micron thick AF45 with $\epsilon_r$=5.9 was cleaned and covered with photoresist (120) by spinning. The target photoresist thickness was, e.g., 3 micron. This layer was used as sacrificial layer.
b) The photoresist (120) was exposed according to a pre-defined pattern (using a mask in an aligner).
c) The photoresist (120) was developed and then cured (baked) in order to ensure its stability for the further processing.
d) A uniform layer of Al-based alloy (110), e.g. 1 micron thick, was sputtered on the wafer (130).
e) A second photoresist was spun on top of the Al layer and patterned as described for the first one in b) and c).
f) The Al layer (110) was wet etched to define the electrodes of the device.
g) Finally, the structures were released through a O2-based plasma etch (dry etching) of the photoresist layers (120).

Additional processes may be implemented like beforehand patterning, e.g., a 1 micron thick Al layer on top of the glass substrate or coating it with 200 nm thick sputtered $Ta_2O_5$ ($\epsilon_r$=25) or 5 micron thick BCB ($\epsilon_r$=2.7).

These embodiments can be implemented to obtain a novel electrostatic actuator. This actuator uses fringing fields as actuation mechanism, Electrostatic Fringing Field Actuator, EFFA. This new technology is demonstrated by producing and characterizing tuneable RF-MEMS devices and circuits in various technological implementations of remarkable simplicity. This simplicity allows a vast flexibility for the processing and as a result strongly eases the integration of the EFFA's into key existing technologies.

The Electrostatic Fringing-Field Actuators (EFFA) used as variable capacitors have been demonstrated in various embodiments.

Figure 14:
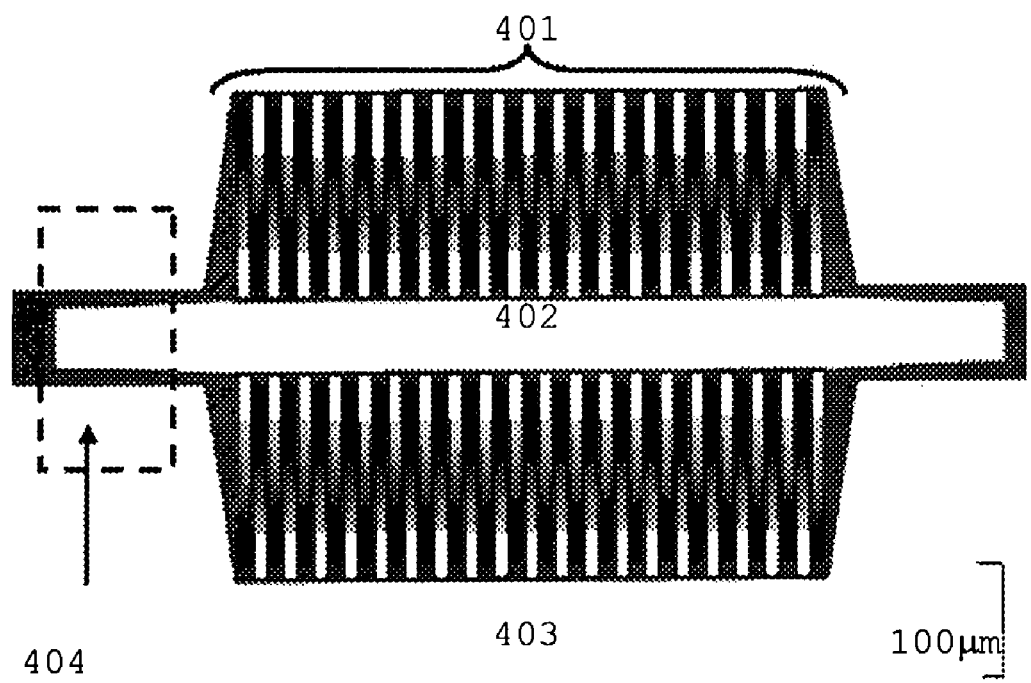
FIG. 14 show a top view microphotograph of a shunt of Electrostatic Fringing Field Actuator (EFFA) RF capacitor.
Figure 15:
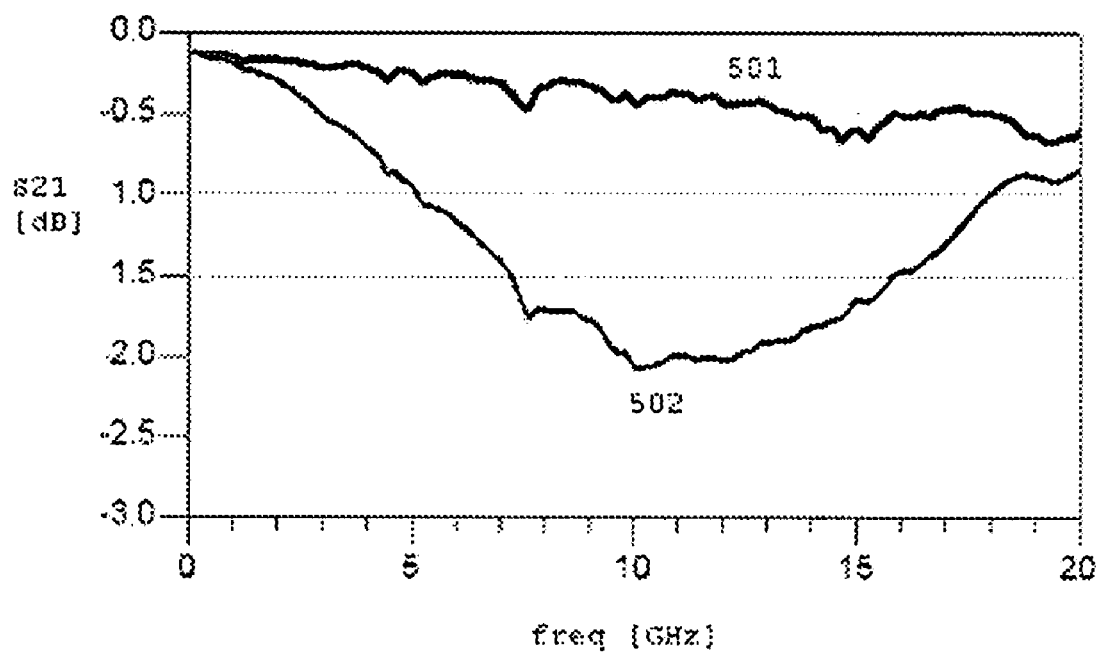
FIG. 15 shows a plot of the measured $S_{21}$ of an EFFA.

FIG. 14 shows a microphotograph of a shunt EFFA-based capacitor for RF-applications. (401) represents an interdigitated EFFA capacitor, (402) is the RF signal line, (403) is the RF ground plane and (404) shows the RF probing area. Its measured $S_{21}$ is plotted in FIG. 15, for the idle-state (501) and the actuated state (502).

In one embodiment, the EFFA variable capacitors have been accommodated for RF-measurement using a second metallization.

Figure 16:
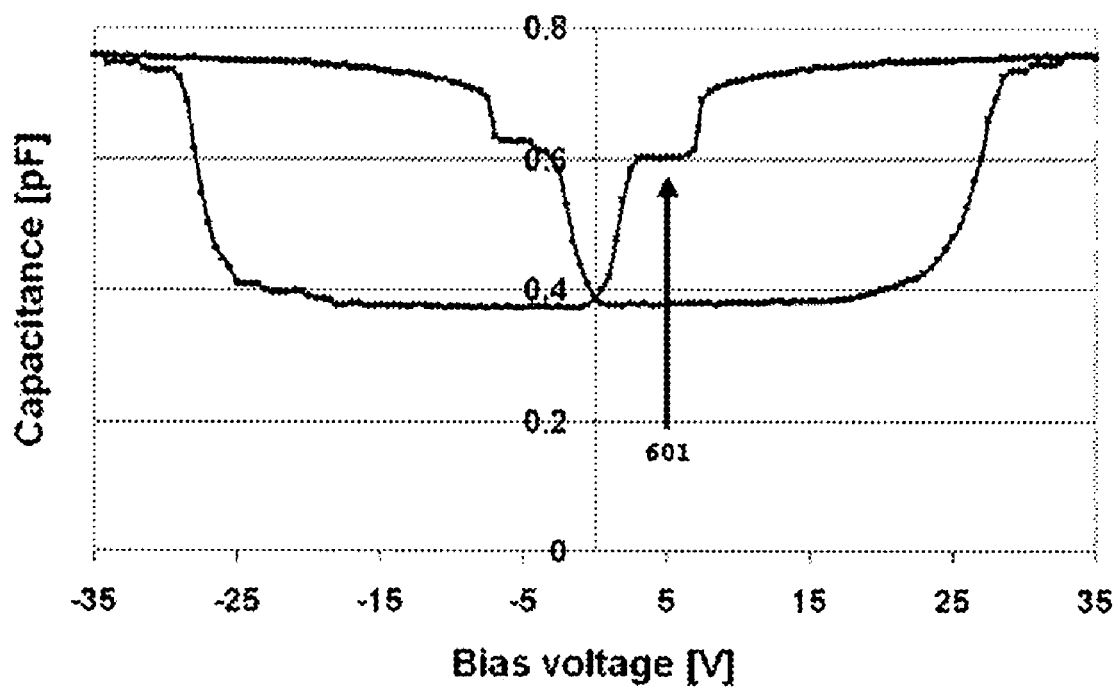
FIG. 16 shows a plot of the C-V characteristics of an EFFA.

In another embodiment, the variable capacitor was also implemented following the basic process flow with one metallization only, defining the RF access in the same layer as the movable electrodes as shown in FIG. 14. Further, the same device was processed on top of, e.g., a 5 micron thick BCB (benzocyclobutene) layer coating the basic glass wafer. With a low relative permittivity ($\epsilon_r$=2.7), BCB produces a mild unbalance of the E-field and an inefficient actuation. As a result, a stable partially-open state (601) appears in the C-V characteristic, see FIG. 16. In this state, the fingers loosen their contact with the BCB but remain down due to the torque they apply on each other.

Figure 17:
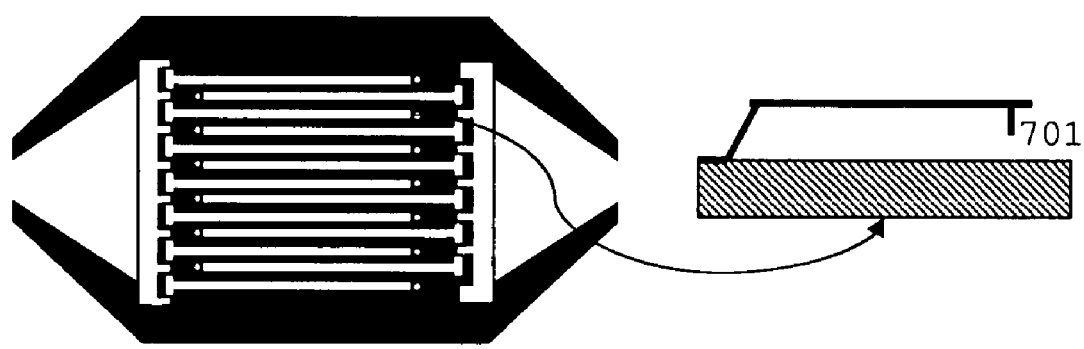
FIG. 17 shows top view microphotograph of a series EFFA RF capacitor with additional anchoring at the tips of the fingers.
Figure 18:
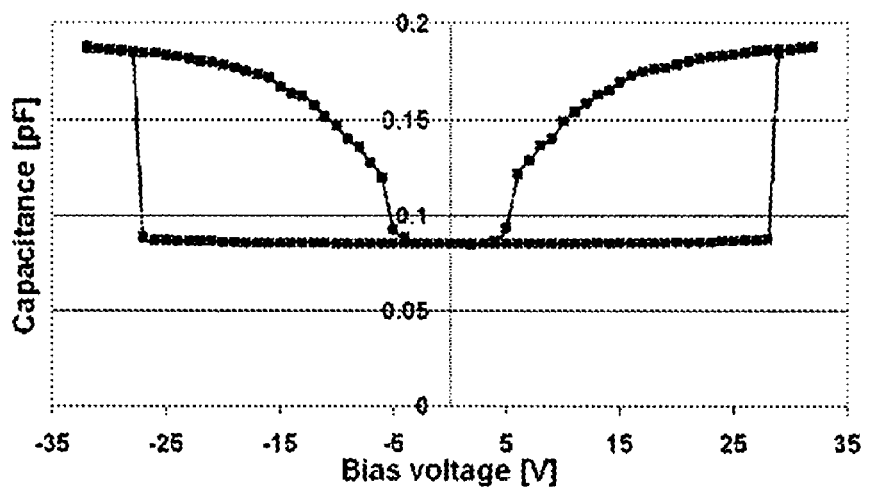
FIG. 18 shows a plot of the measured C-V of EFFA.

In another embodiment, floating anchors (701) at the tips of the fingers are added, as shown in FIG. 17. These floating anchors mitigate the effect of the stress gradient on the free-standing beams. The sole possible actuation results then from the unbalance of the E-field. The capacitance contrast between idle and actuated states is only due to the contact with the substrate. Processed on a glass substrate coated with, e.g., a 200 nm thick sputtered $Ta_2O_5$ layer, $\epsilon_r$=25, the capacitance ratio still reaches 1:2 as shown in FIG. 18. It can be tuned by adapting the design, e.g. spacing between the fingers, or the technology, e.g. thickness of the dielectric coating.

Figure 19:
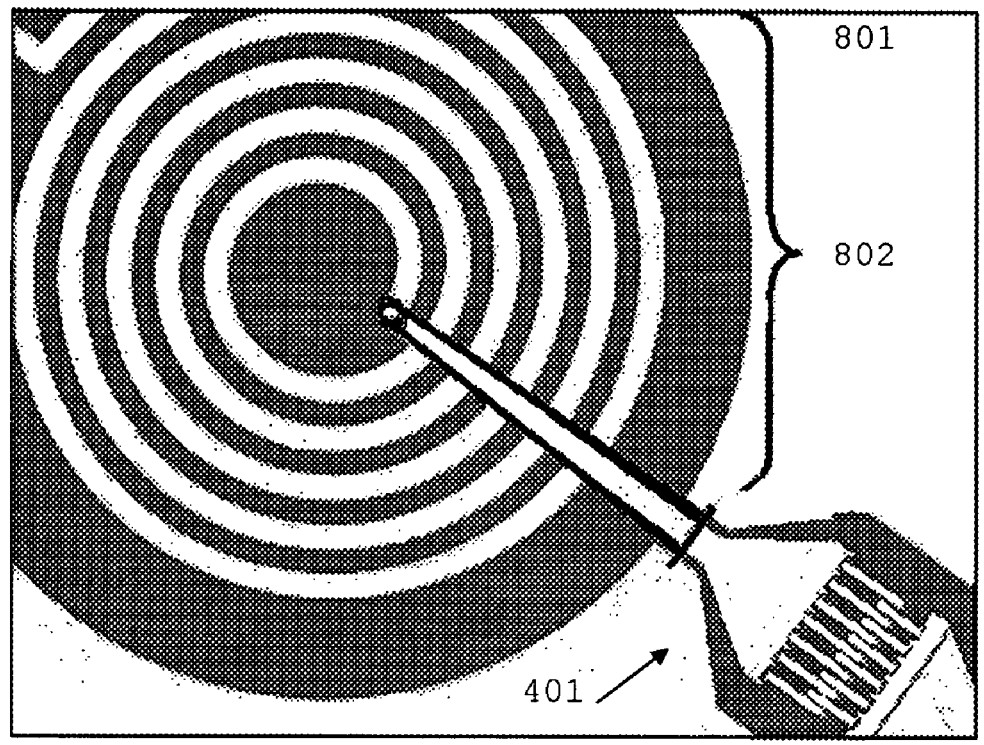
FIG. 19 shows a microphotograph of a processed series LC-tank implementing a fixed spiral inductor and a series EFFA capacitors.

In another embodiment, the implementation of a second metallization is described. It allows defining the underpass of spiral inductors (802) used in tuneable LC-tanks (801) shown in FIG. 19.

Figure 20:
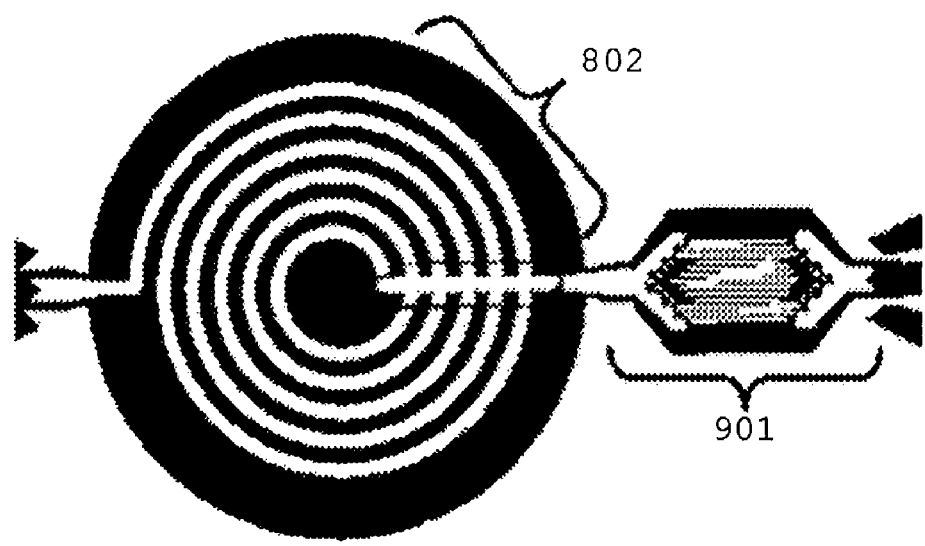
FIG. 20 shows a tunable LC-tank with a variable length series EFFA.

In a slightly different embodiment, a variable LC-tank with variable length series EFFA (901) is presented, see FIG. 20. The length of the fingers was varied within the same EFFA to allow a progressive frequency tuning and not only a switching.

Figure 21:
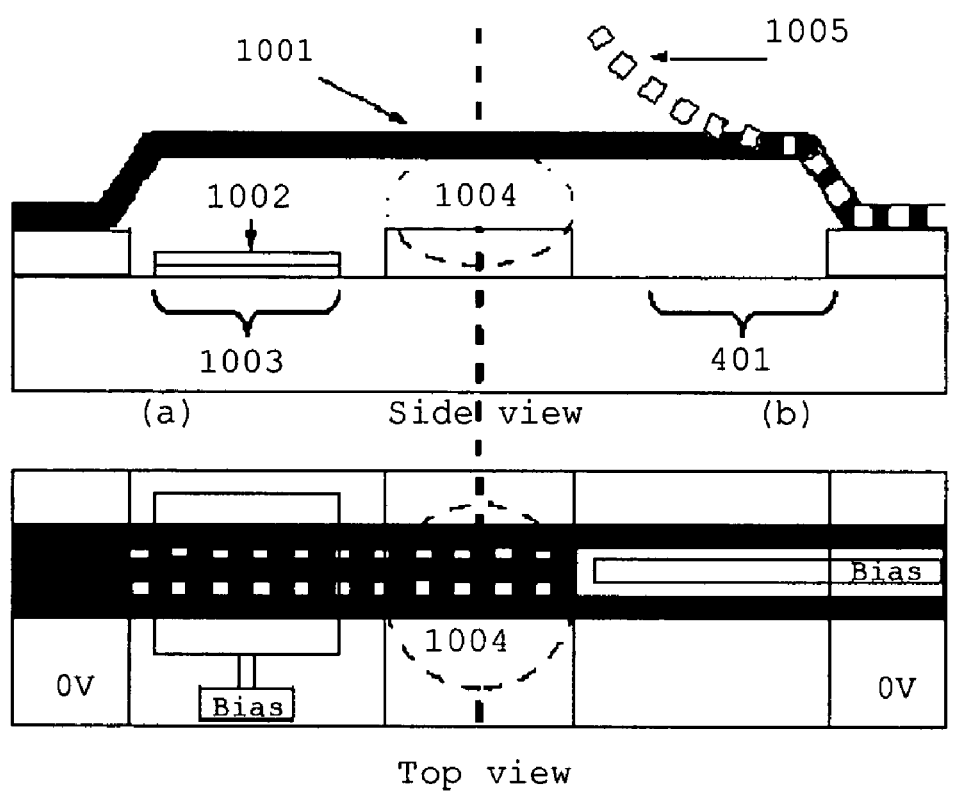
FIG. 21 shows schematic side- and top-views of a shunt relay. On the left: conventional parallel-plate actuator, on the right: EFFA.

Relay devices, separating DC- and RF-signals, are key elements to solve the problems of bias distribution throughout complex RF-MEMS circuits. Parallel-plate capacitors (1003) can be implemented as EFFA-based relays to define either ohmic relays or high capacitance ratio relays. A conventional implementation of an electrostatic relay is depicted in FIG. 21(a). A parallel-plate actuator (1003) with a fixed electrode (1002) is defined under a grounded bridge (1001), away from the central RF-contact (1004) area. The RF-contact (1004) closes. The fixed electrode (1002) is coated to prevent any DC-short during the actuation.

On FIG. 21(b), the parallel-plate actuator (1003) is replaced by an EFFA (401). The RF-structure is anchored through 2 grounded legs interdigitated with an actuation finger (1005), e.g. clamped-free in this case. Upon actuation of a bias to the hot finger (1005), the legs and hot finger contact in the substrate, closing as a result the RF-contact (1004).

Figure 22:
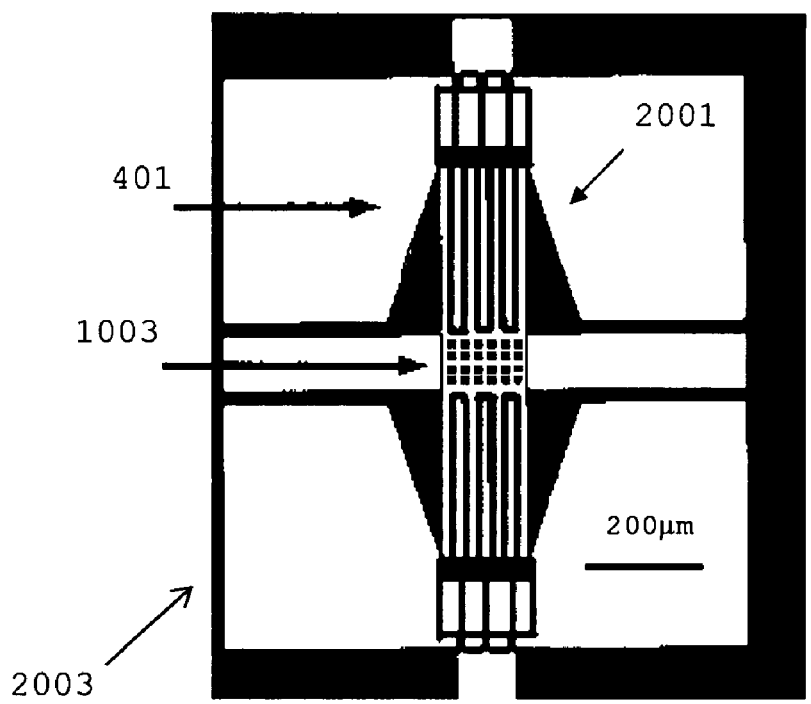
FIG. 22 shows a shunt switchable capacitor actuated as a relay by EFFA's beside the signal line.

An example of a shunt relay is depicted in FIG. 22 A moving electrode overlaps with the signal line of a CPW. It is in this case anchored in the ground through 4 legs interdigitated with 3 actuation fingers (2001) biased through 1 separate DC pad (2003). The DC voltage drop between top and bottom electrodes of the RF capacitor is nil. In down-state, the device defines a capacitance limited by the native $AlO_x$ thickness and the contact quality between the electrodes. The measured capacitance ratio of this device is reached 1:7.

Figure 23:
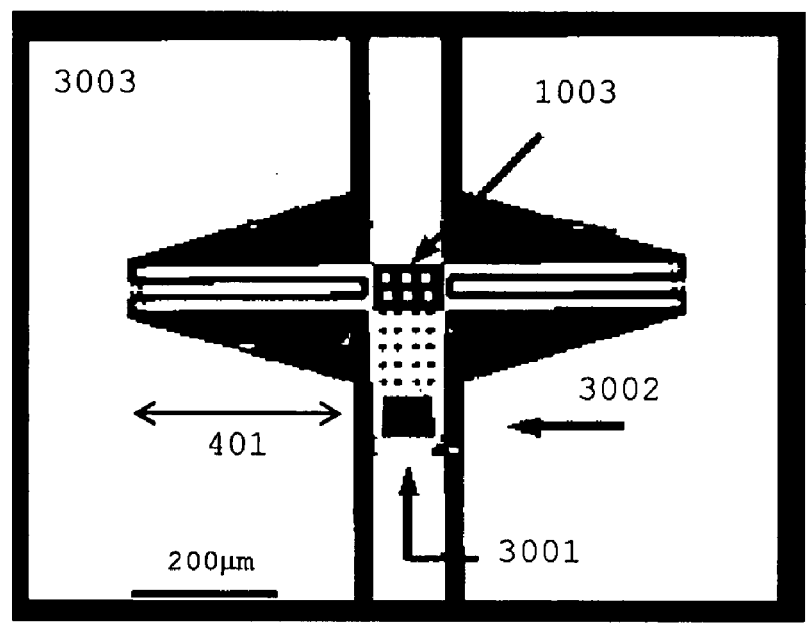
FIG. 23 shows a series switchable capacitor actuated as a relay by 2 transverse EFFA's.

In a comparable way, a series tuneable capacitor (3003) can be designed, FIG. 23. A cantilever beam (3002) anchored (3001) at the bottom in one part of a CPW overlaps with another CPW at the top. Transverse restraining bridges at the tip of the cantilever lower the impact of the stress gradient on the idle-capacitance definition. They further allow designing 2 transverse EFFA's (401) with the addition of actuation fingers. In the present case, RF-grounded beams interdigitated with the transverse beams are used. At low frequency, the EFFA capacitance is small enough to isolate the signal line from the ground planes while providing an efficient actuation mechanism. The device is thus actuated by biasing both signal lines versus the ground planes. It is thus not a relay in the sense that DC- and RF-signals are superposed but well in the sense that the actuation is separated from the sensing, i.e. the RF-functionality.

Figure 24:
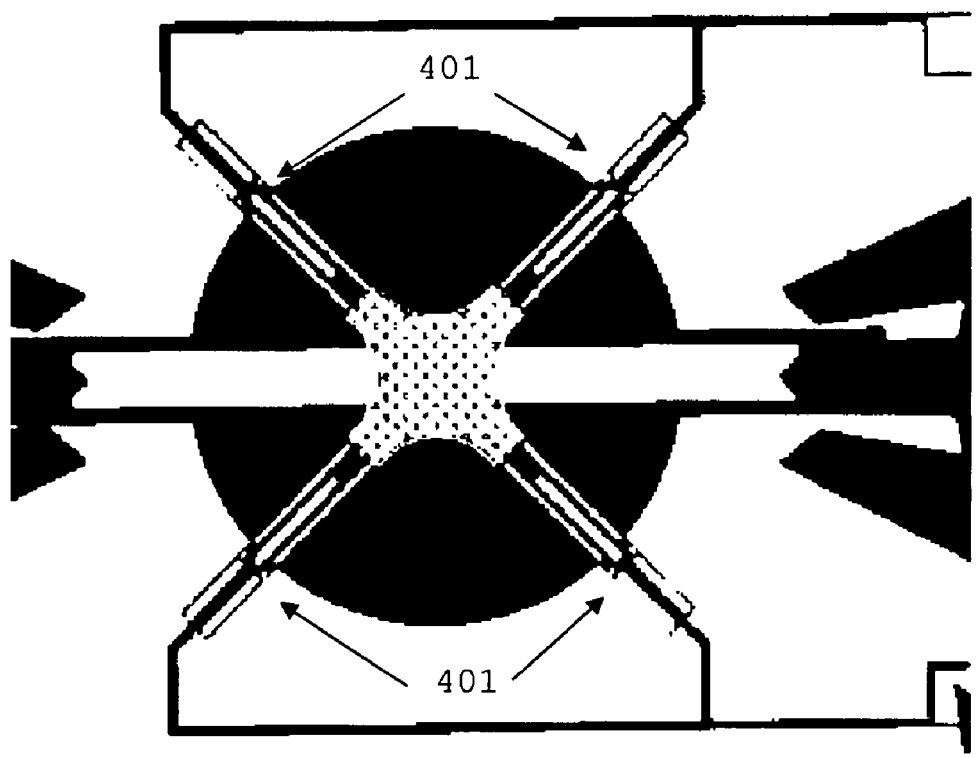
FIG. 24 shows a shunt capacitive relay implementing 4 EFFA's as side-actuators.

A shunt capacitive relay can be based on the design of the device of FIG. 22, see FIG. 24. It is designed to present shunt switching characteristics, e.g. low insertion loss in idle-state and high isolation in actuated-state. The large top electrode is spun between 4 double legs constituting the grounded parts of 4 EFFA's (401). The hot fingers of the actuators are either clamped-free beams or fixed stripes processed in contact with the substrate to lower the actuation voltage.

Of course, the processes used and described previously are only indicative. The sputtering of the Al layer can be replaced for example by the plating of another metal while polyimide, along with a wide variety of other materials, can be used as a sacrificial layer.

Another interesting basic process flow can nevertheless be presented that would use the same principle layout as the process flow already presented:
 a) A metal layer is deposited and patterned on top of a glass substrate, e.g. plated Cu.
 b) The anchored portions of the device are protected for example using a polyimide layer.
 c) The glass is wet etched using the patterned metal and deposited polyimide as mask. The non-protected metal patterns are so released.
 d) A O2-based plasma etch (dry etch) of the photoresist layer finally cleans the device.

Figure 25:
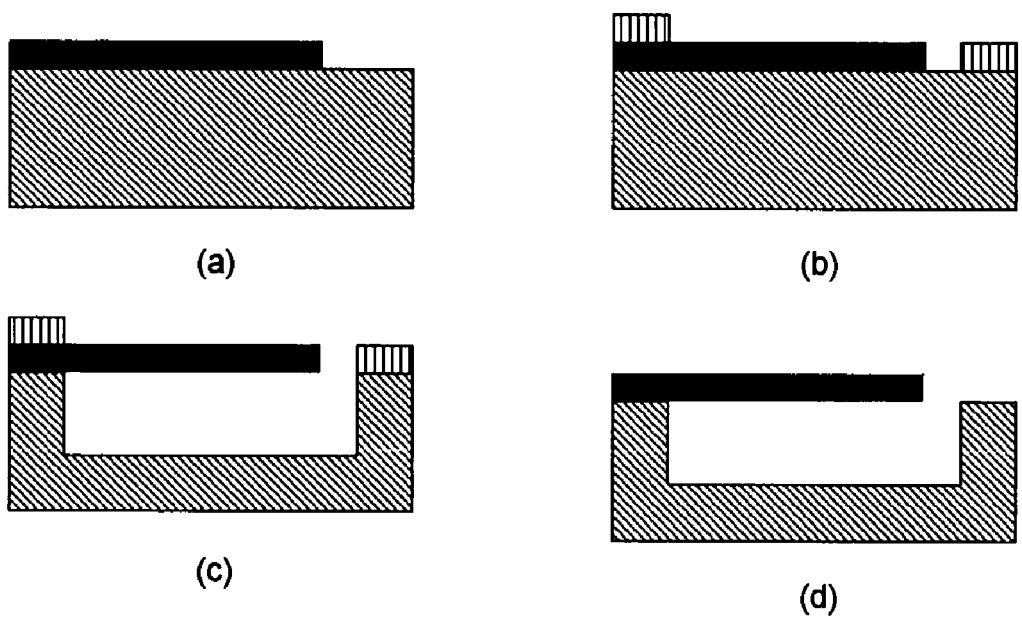
FIG. 25 shows a possible alternative process flow.

FIG. 25 presents schematically an alternative process flow. Note that the positive stress gradient was named as it commonly occurs in thin film MEMS processing. It is indeed often preferable that the deflection of the device is directed away from the substrate. The variable capacitors we describe would nevertheless be fully functional curling downwards, even touching partially underlying layers.

A number of alternative embodiments concerning the EFFA design are presented.

Figure 26:
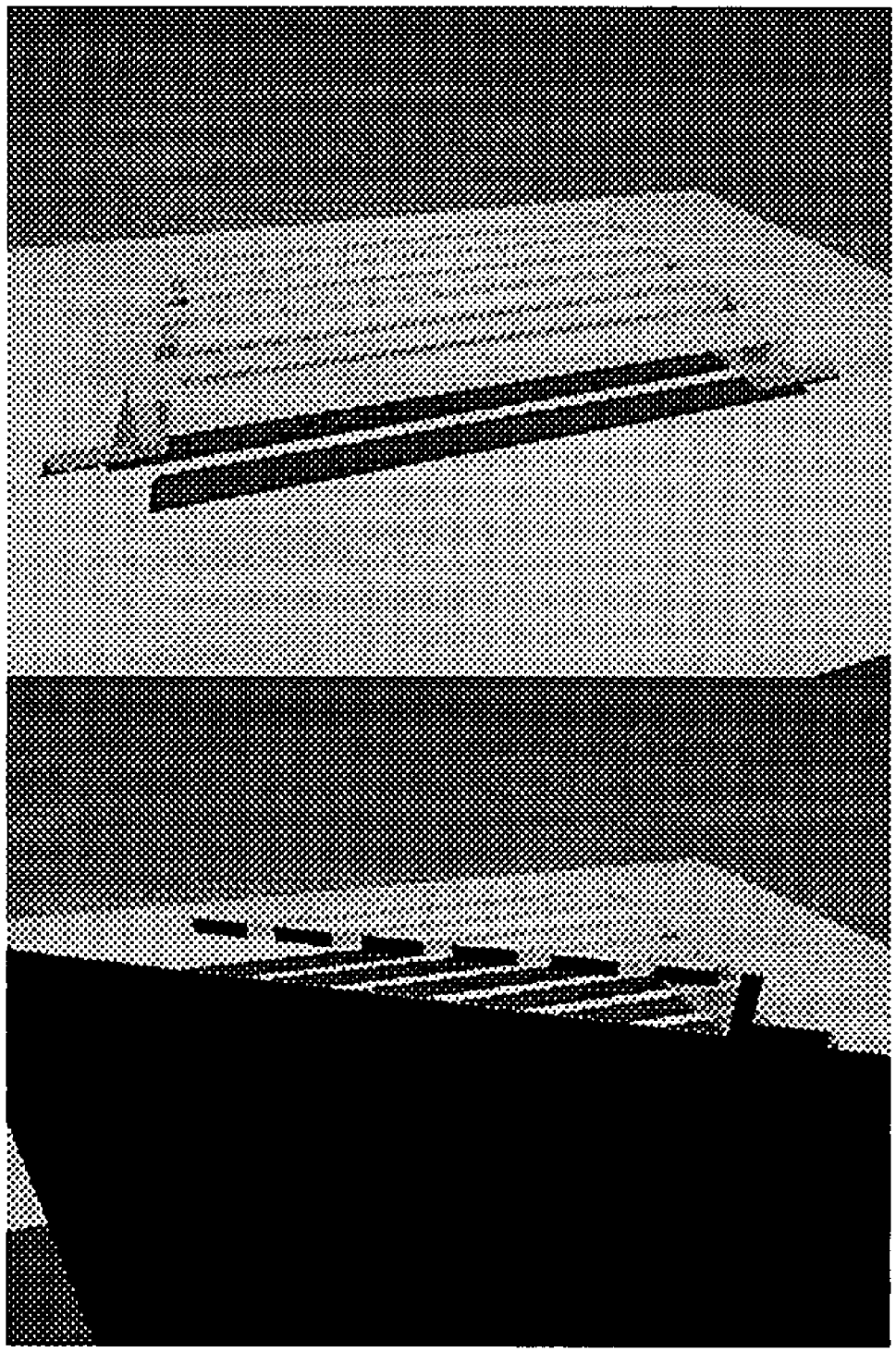
FIG. 26 shows a 3D-visualization of a basic variable capacitor.

The basic embodiment is presented in FIG. 26

Figure 27:
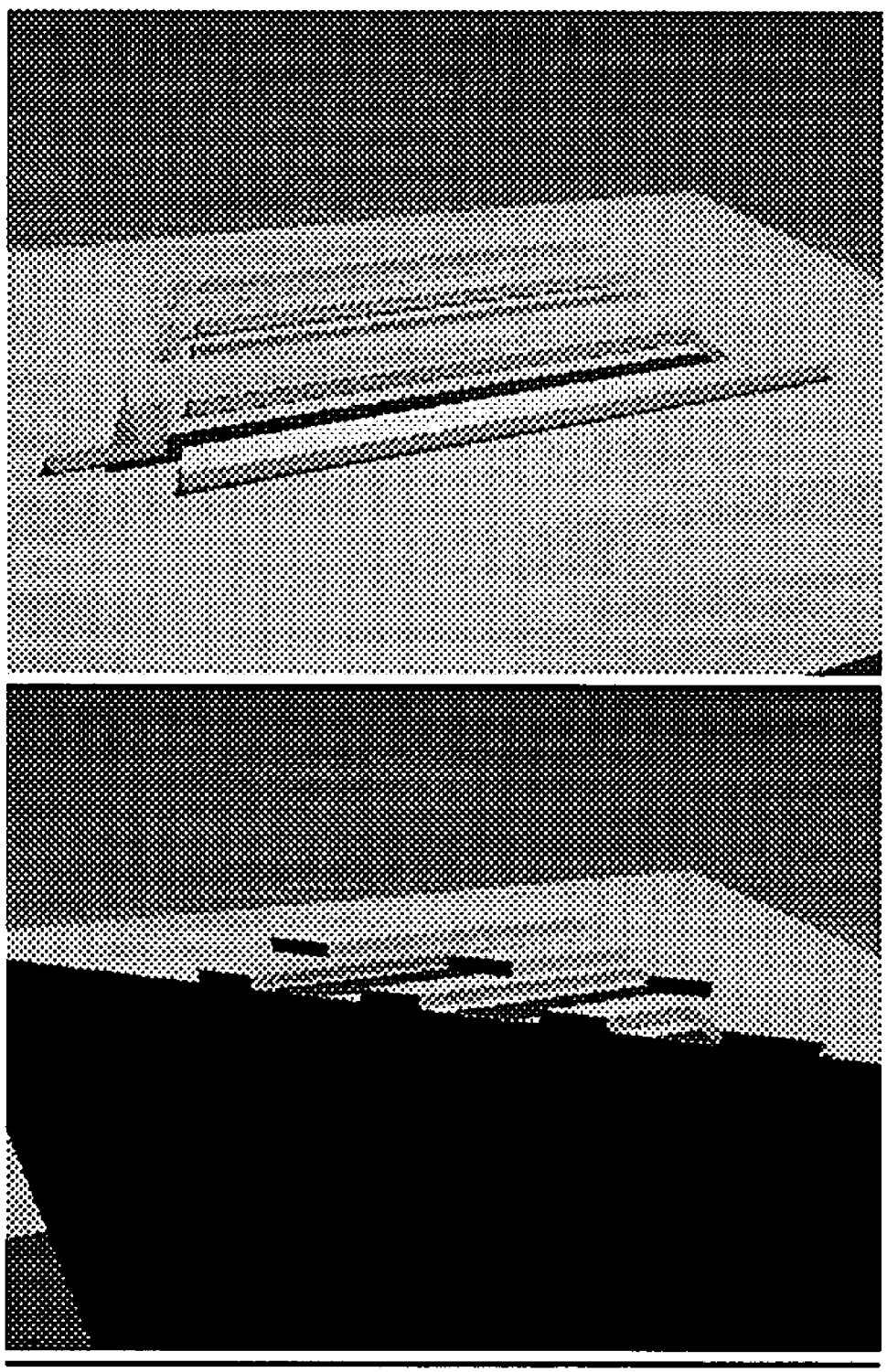
FIG. 27 shows a 3D-visualization of an asymmetric variable capacitor.

The asymmetric embodiment is presented in FIG. 27 where the finger set on the right lies on the substrate.

Figure 28:
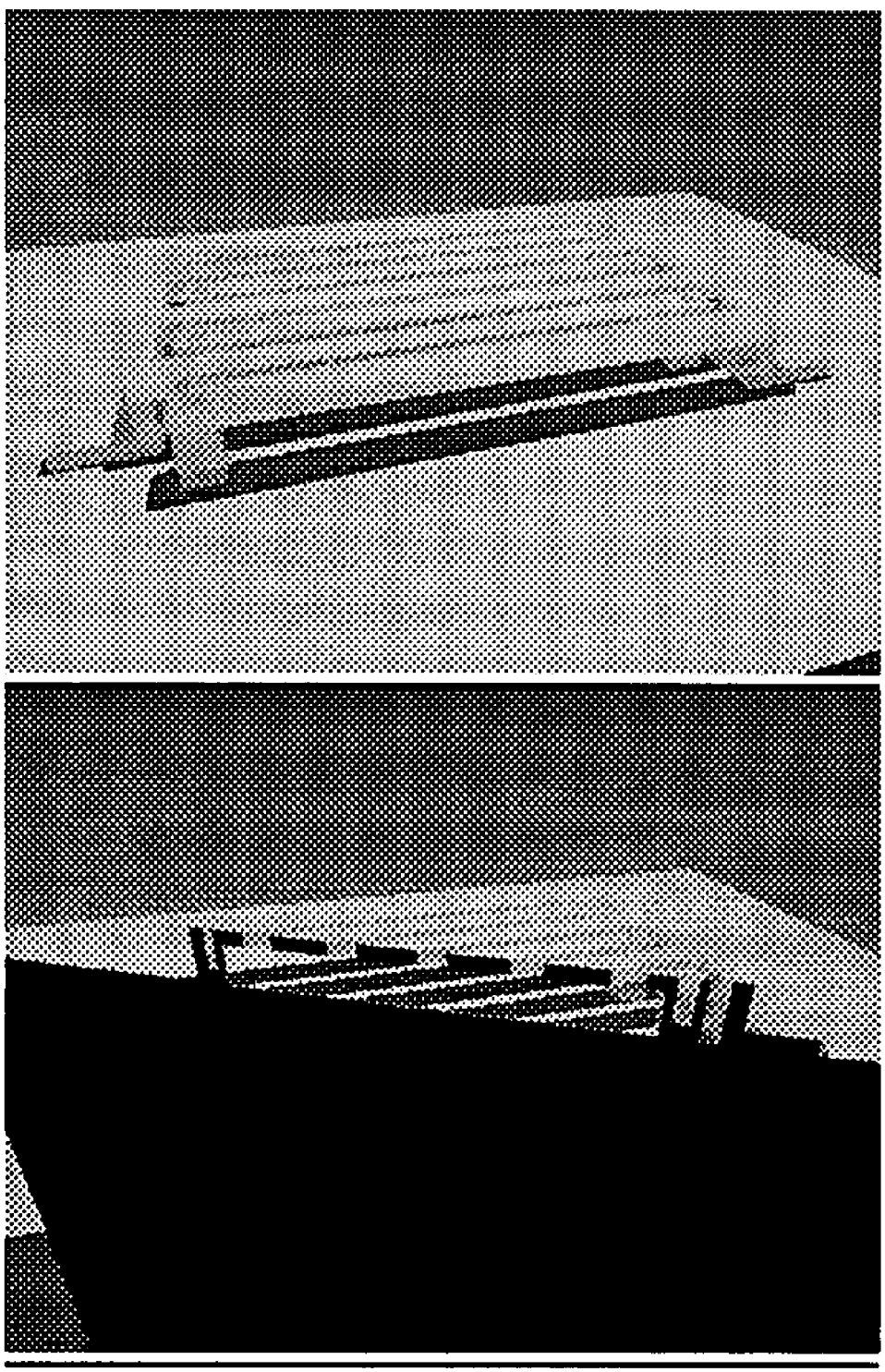
FIG. 28 shows a 3D-visualization of a variable capacitor implementing bridges.

The implementation of using bridges instead of cantilever beams as shown in is further sketched in FIG. 28.

Figure 29:
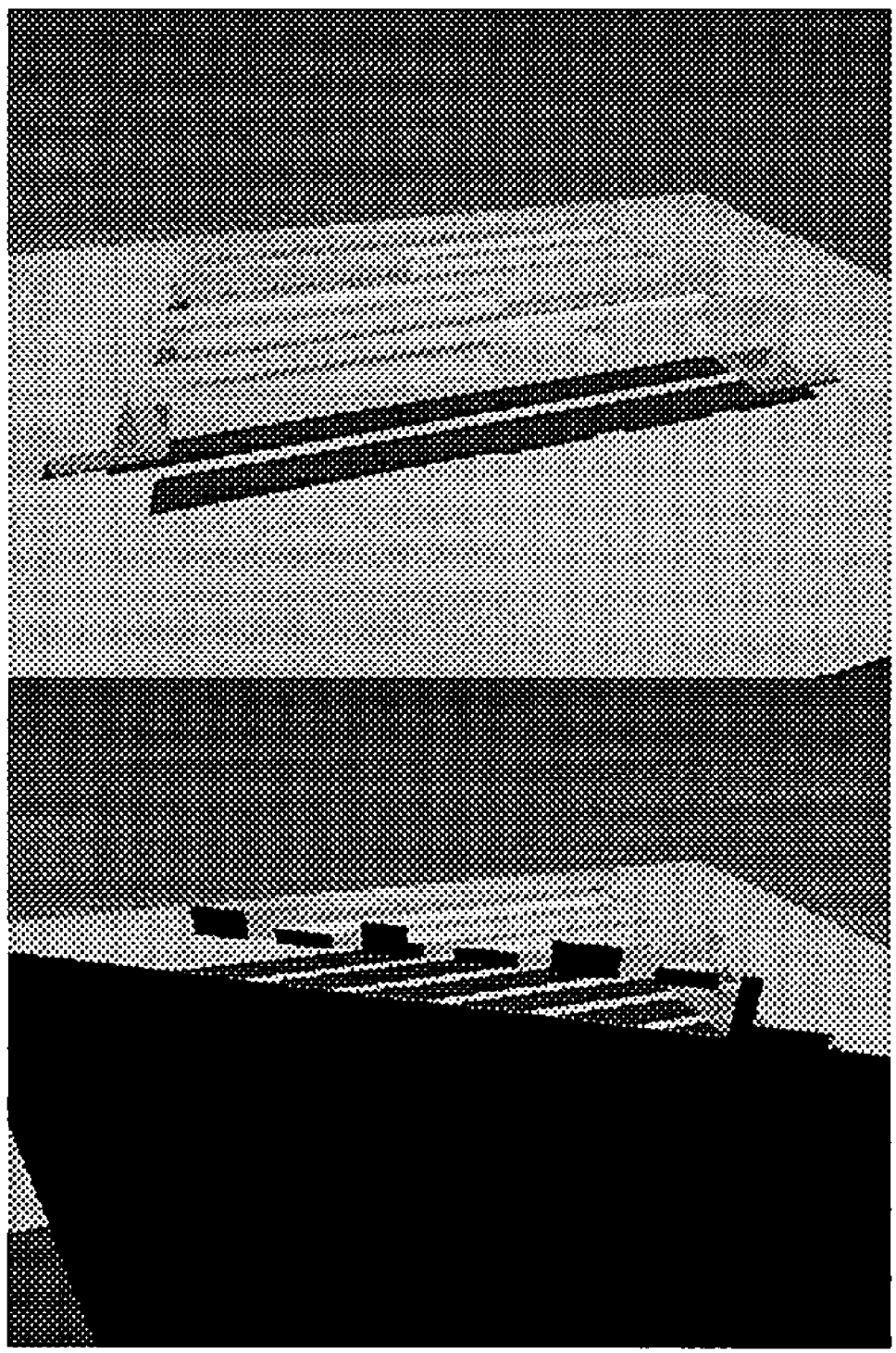
FIG. 29 shows a 3D-visualization of a variable capacitor with locally thickened moving electrodes.

To modify the C-V characteristics further than using the shapes of the electrodes, e.g. spacing, length, pattern, . . . , the device can be uniformly or locally stiffened by thickening the electrodes. This is sketched in FIG. 29.

Figure 30:
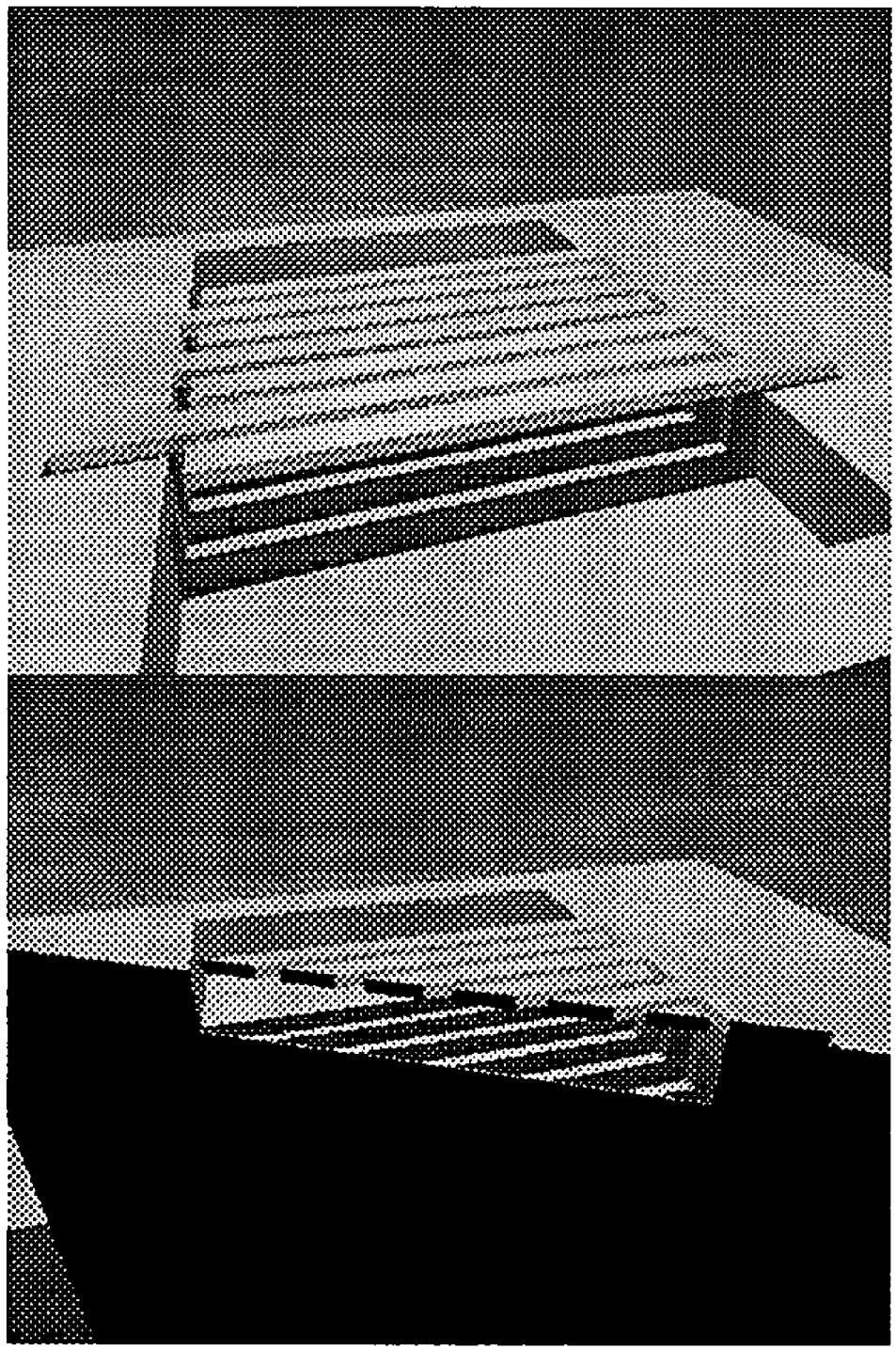
FIG. 30 shows a 3D-visualization of a variable capacitor moving in an underlying cavity.

A further embodiment is presented in FIG. 30 where the fingers move downwards in an underlying cavity.

Figure 31:
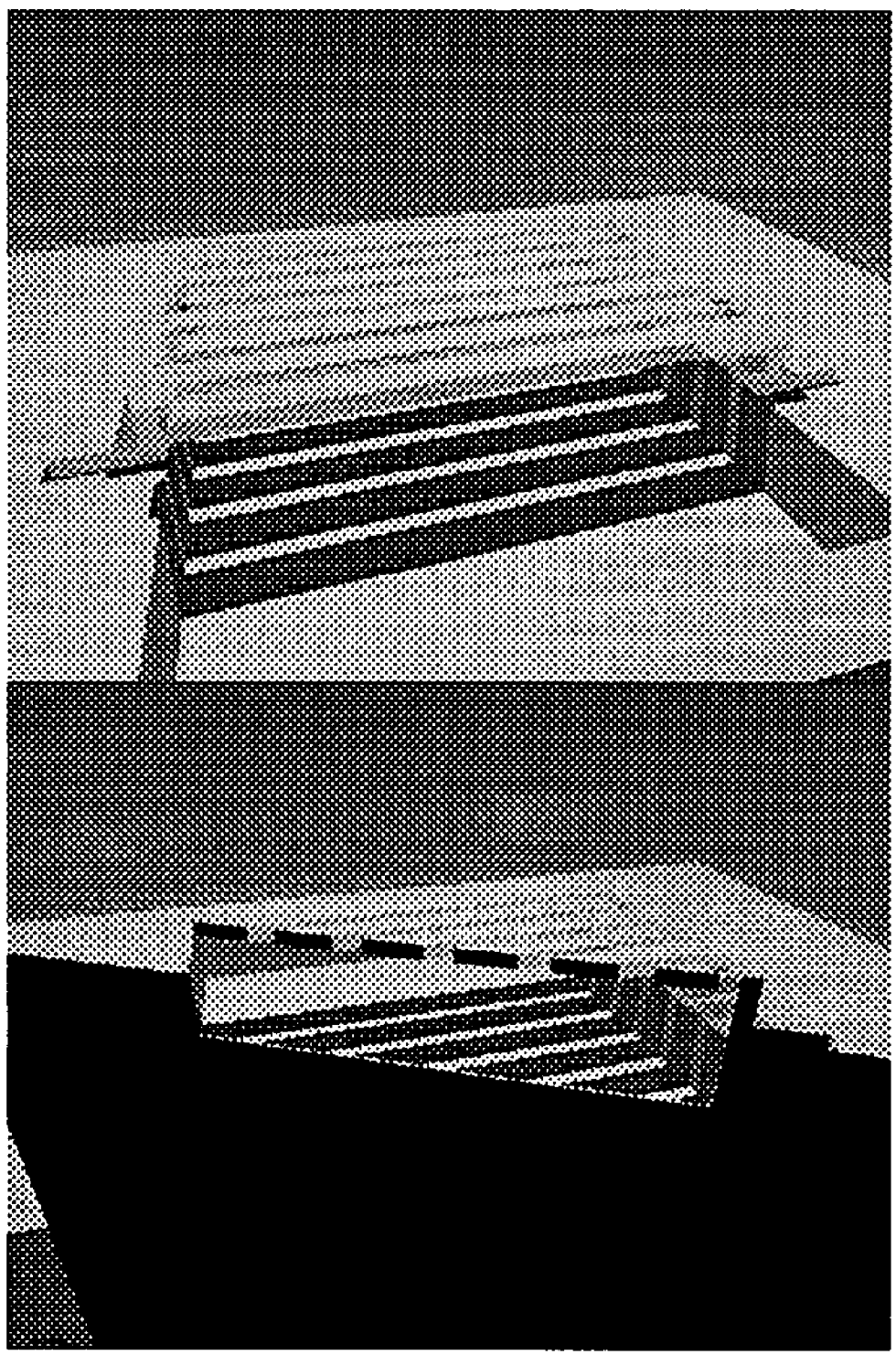
FIG. 31 shows a 3D-visualization of a variable capacitor moving in an underlying cavity.

In FIG. 31 the fingers were processed on the substrate before etching the cavity. They are therefore perfectly flat.

Figure 32:
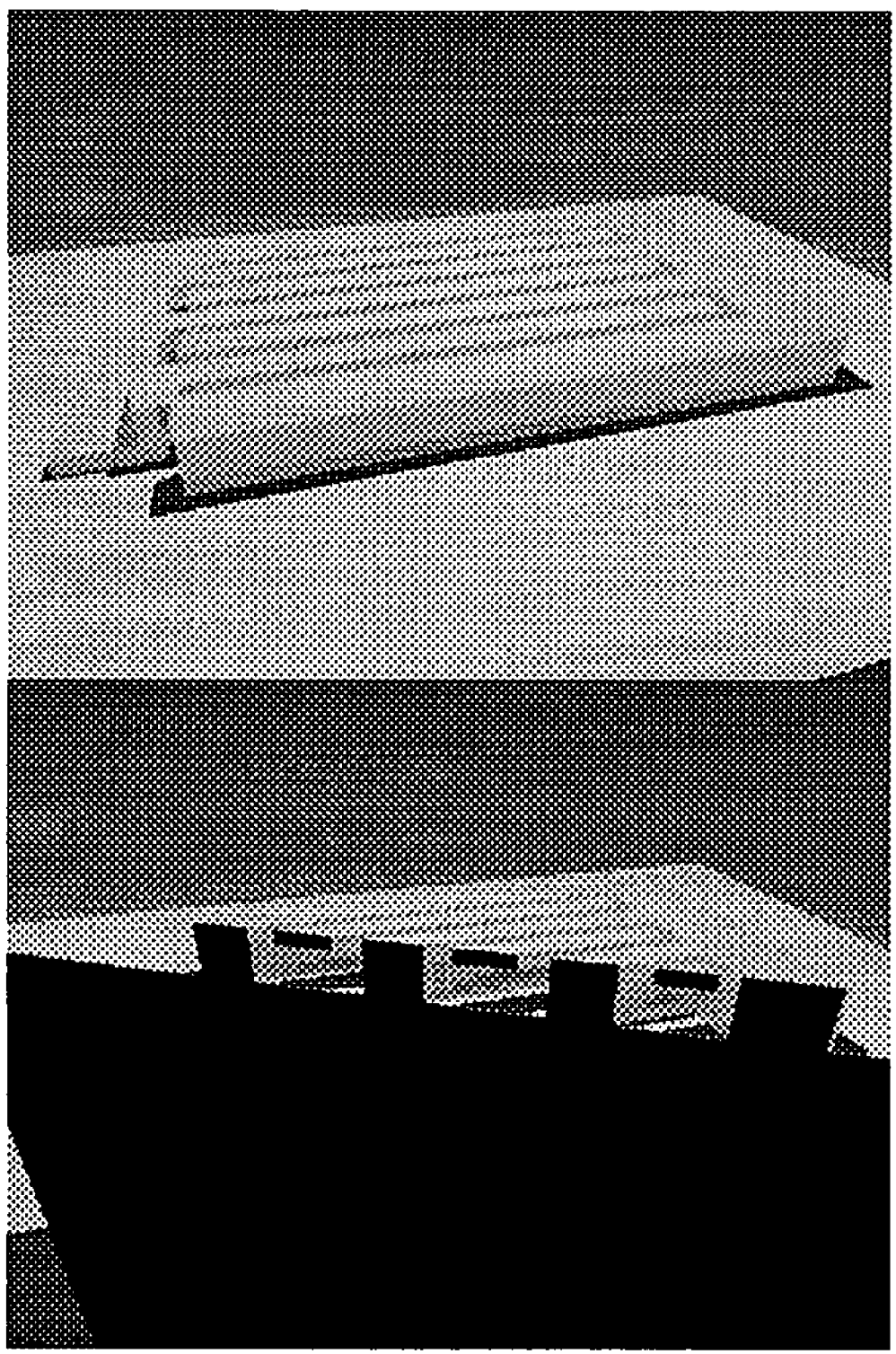
FIG. 32 shows a 3D-visualization of a variable capacitor with a fixed thick electrode.
Figure 33A:
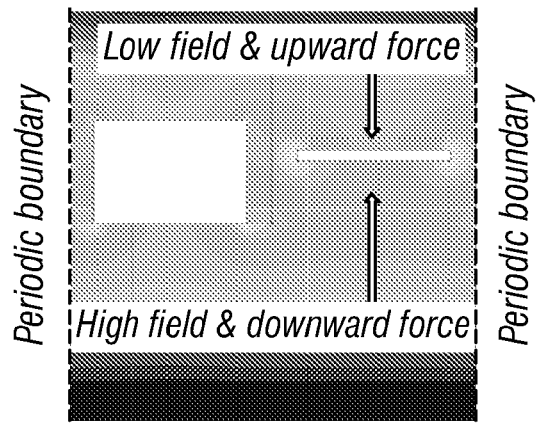
FIG. 33 shows the electric field distribution in the cross section of a unit periodic cell.
Figure 33B:
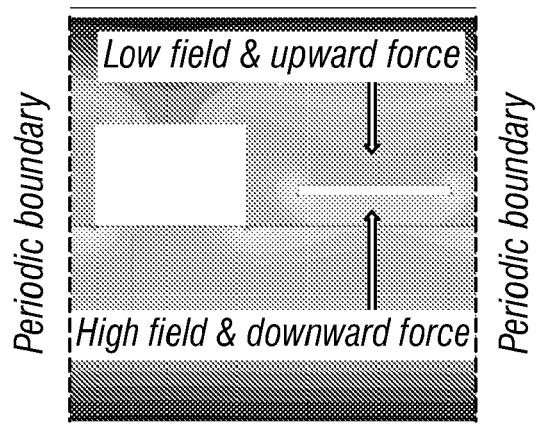
Figure 33C:
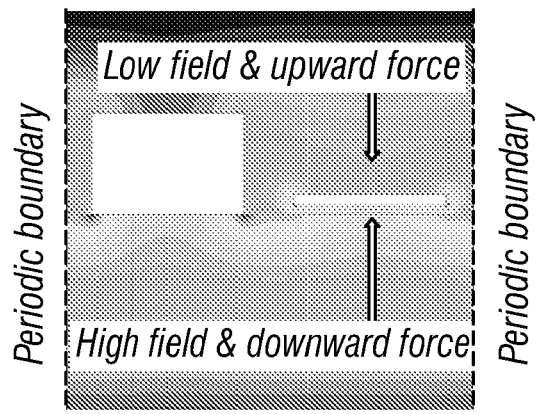

In a further embodiment presented in FIG. 32 one electrode or set of fingers is made thicker than the other and processed directly on the substrate. This modifies the evolution of the capacitance and electrostatic force on the moving electrode during its displacement as sketched in FIG. 33 Depending on the thickness of the electrodes, the relative permittivity of the substrate and the design parameters, like the spacing between the fingers, a stable actuated state can be produced without contacting the substrate.

Figure 34:
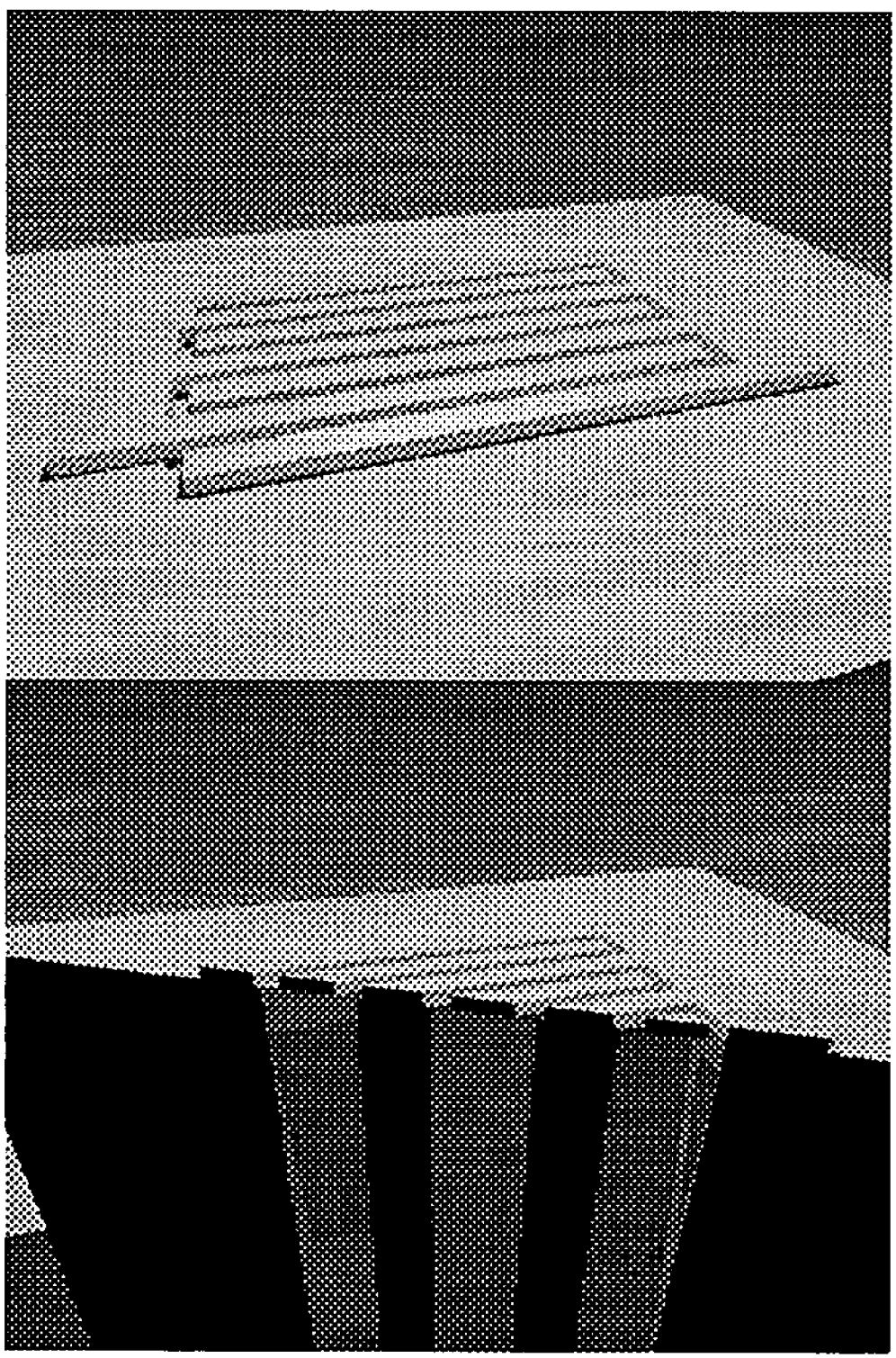
FIG. 34 shows a 3D-visualization of a variable capacitor.
Figure 35A:
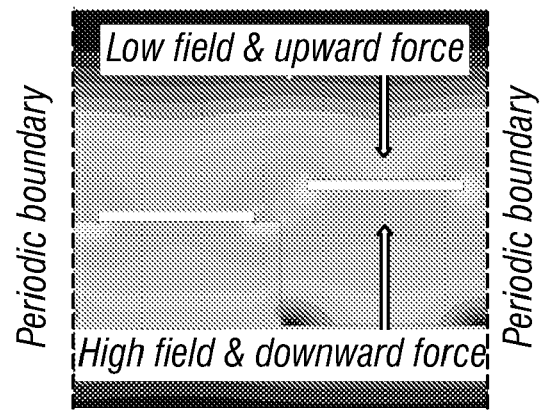
FIG. 35 shows the electric field distribution in the cross section of a unit periodic cell.
Figure 35B:
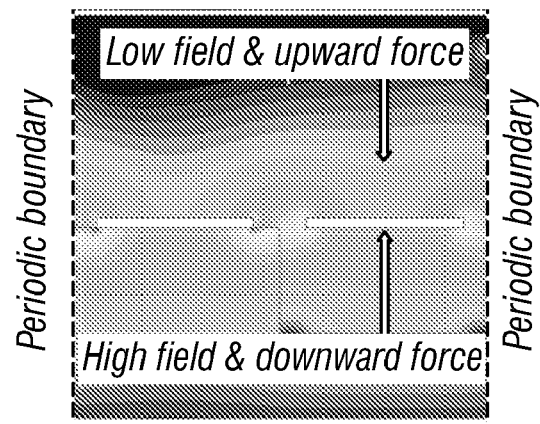
Figure 35C:
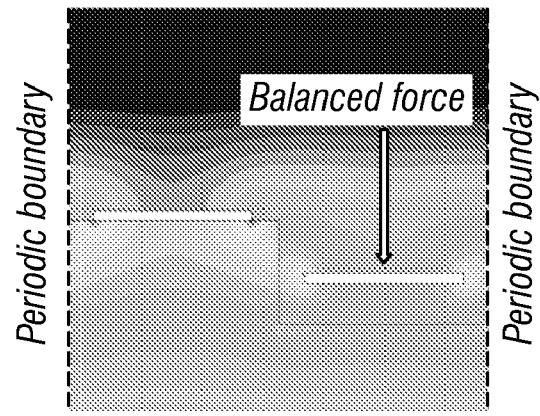

The same results can be obtained with electrodes of equal thicknesses by producing for example substrate cavities under portions of the electrodes as shown in FIG. 34. FIG. 35 shows the evolution of the electric field distribution around the electrodes in this case during the displacement of the moving portions.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope

What is claimed is:

1. A variable capacitor comprising:
 first and second electrically conductive electrodes arranged above a support structure, the electrodes defining the capacitance of the capacitor and being arranged such that orthogonal projections of the electrodes on the plane of the support structure are non-overlapping, at least one of the electrodes comprising at least one bendable portion being movable perpendicular to the support structure; and
 an actuation element configured to apply a voltage difference between the electrodes to actuate the bendable portion thus varying the capacitance of the variable capacitor.

2. The variable capacitor according to claim 1, wherein the actuation element further comprises a layer within the support structure having a higher permittivity value than the atmosphere surrounding the electrodes.

3. The variable capacitor according to claim 2, wherein the electrodes are arranged substantially in the same plane, with the bendable portions laying out of the plane in idle state, and laying substantially in the plane upon actuation with a predetermined first voltage.

4. The variable capacitor according to claim 2, wherein each of the electrodes comprises at least one of the bendable portions.

5. The variable capacitor according to claim 2, wherein the bendable portions are configured to be pulled towards the support structure upon actuation with a predetermined second voltage.

6. The variable capacitor according to claim 5, wherein upon actuation with the second voltage the bendable portions come into physical contact with the support structure.

7. The variable capacitor according to claim 2, wherein the bendable portions are cantilevered structures comprising an anchored portion and a free-standing portion.

8. The variable capacitor according to claim 2, wherein the electrodes comprise patterned metal layers.

9. The variable capacitor according to claim 2, wherein the electrodes are formed out of the same layer.

10. The variable capacitor according to claim 2, wherein the electrodes comprise one or more sub layers.

11. The variable capacitor according to claim 10, wherein one of the sub layers is formed as a piezoelectric layer for enabling piezoelectric actuation in a first actuation stage.

12. The variable capacitor according to claim 2, wherein one of the electrodes is fixed on the support structure.

13. The variable capacitor according to claim 2, wherein the support structure comprises recesses arranged for accepting the bendable portions when actuated.

14. The variable capacitor according to claim 2, wherein the electrodes are digitated structures when not actuated, and are configured to form an interdigitated structure upon actuation.

15. The variable capacitor according to claim 14, wherein the length of the digitated structures is varied.

16. The variable capacitor according to claim 2, wherein the support structure is a multilayer structure.

17. The variable capacitor according to claim 16, wherein the support structure comprises an MCM-D substrate.

18. A device comprising the variable capacitor according to claim 2.

19. The device according to claim 18, wherein the device is an LC-tank.

20. The device according to claim 18, wherein the device is a relay.

21. The device according to claim 18, wherein the device is a shunt relay capacitor.

22. The device according to claim 18, wherein the device is a series relay capacitor.

* * * * *